LOIN SEVERING APPARATUS

Filed May 15, 1961 21 Sheets-Sheet 1

Inventors:
Norman H. Vogt
Harry W. Keprin
Samuel P. Pasutin
By Carl C. Batz
Attorney Dec. 8, 1964 N. H. VOGT ETAL 3,159,869

LOIN SEVERING APPARATUS

Filed May 15, 1961 21 Sheets-Sheet 2

Inventors:
Norman H. Vogt
Harry W. Weprin
Samuel P. Pasutin
By Carl C. Batz

Dec. 8, 1964 N. H. VOGT ETAL 3,159,869

LOIN SEVERING APPARATUS

Filed May 15, 1961 21 Sheets-Sheet 3

Inventors:
Norman H. Vogt
Harry W. Weprin
Samuel P. Pasutin
By Carl C. Batz
Attorney Inventors
Norman H. Vogt
Harry W. Weprin
Samuel P. Pasutin
By Carl C. Batz
Attorney Dec. 8, 1964 N. H. VOGT ETAL 3,159,869

LOIN SEVERING APPARATUS

Filed May 15, 1961 21 Sheets-Sheet 5

Inventors:
Norman H. Vogt
Harry W. Weprin
Samuel P. Pasutin
By Carl C. Batz
Attorney.

Inventors:
Norman H. Vogt
Harry W. Wepprin
Samuel P. Pasutin
By Carl C. Batz
Attorney Inventors:
Norman H. Vogt
Harry W. Weprin
Samuel P. Pasutin
By Carl C. Batz
Attorney.

Inventors:
Norman H. Vogt
Harry W. Weprin
Samuel P. Pasutin
By Carl C. Batz
Attorney.

Inventors:
Norman H. Vogt
Harry W. Weprin
Samuel P. Lasutin
By Carl C. Batz
Attorney Dec. 8, 1964 N. H. VOGT ETAL 3,159,869

LOIN SEVERING APPARATUS

Filed May 15, 1961 21 Sheets-Sheet 10

Inventors:
Norman H. Vogt
Harry W. Weprin
Samuel P. Rasubin
By Carl C. Batz
Attorney

LOIN SEVERING APPARATUS

Filed May 15, 1961 21 Sheets-Sheet 11

Inventors:
Norman H. Vogt
Harry W. Weprin
Samuel P. Pasutin
By Carl C. Batz
Attorney Dec. 8, 1964 N. H. VOGT ETAL 3,159,869

LOIN SEVERING APPARATUS

Filed May 15, 1961 21 Sheets-Sheet 12

Inventors:
Norman H. Vogt
Harry W. Weprin
Samuel P. Pasutin
By Carl C. Batz
Attorney.

LOIN SEVERING APPARATUS

Inventors:
Norman H. Vogt
Harry W. Weprin
Samuel P. Pasubin
By Carl C. Batz
attorney

LOIN SEVERING APPARATUS

Inventors:
Norman H. Vogt
Harry W. Weprin
Samuel P. Pasutin
By Carl C. Batz
Attorney Inventors:
Norman H. Vogt
Harry W. Weprin
Samuel T. Pasulin
By Carl C Batz
Attorney.

LOIN SEVERING APPARATUS

Filed May 15, 1961

21 Sheets-Sheet 16

Inventors:
Norman H. Vogt
Harry W. Weprin
Samuel P. Pasubin
By Carl C. Batz
Attorney.

Dec. 8, 1964 N. H. VOGT ETAL 3,159,869

LOIN SEVERING APPARATUS

Filed May 15, 1961 21 Sheets-Sheet 17

Inventors:
Norman H. Vogt
Harry W. Weprin
Samuel P. Pasutin
By Carl C. Batz
Attorney Inventors:
Norman H. Vogt
Harry W. Weprin
Samuel P. Pasulin
By Carl C. Batz
Attorney.

LOIN SEVERING APPARATUS

Inventors:
Norman H. Vogt
Harry W. Weprin
Samuel P. Pasutin
By Carl C. Batz
Attorney

LOIN SEVERING APPARATUS

Filed May 15, 1961 21 Sheets-Sheet 20

Inventors:
Norman H. Vogt
Harry W. Weprin
Samuel P. Paputin
By Carl C. Batz
Attorney.

Inventors:
Norman H. Vogt
Harry W. Weprin
Samuel P. Pasutin
By Carl C. Batz
Attorney 3,159,869
LOIN SEVERING APPARATUS
Norman H. Vogt, Clawson, Mich., Harry W. Weprin, Chicago, Ill., and Samuel P. Pasutin, Royal Oak, Mich., assignors to Armour and Company, Chicago, Ill., a corporation of Delaware
Filed May 15, 1961, Ser. No. 110,076
5 Claims. (Cl. 17—1)

Figure 1:
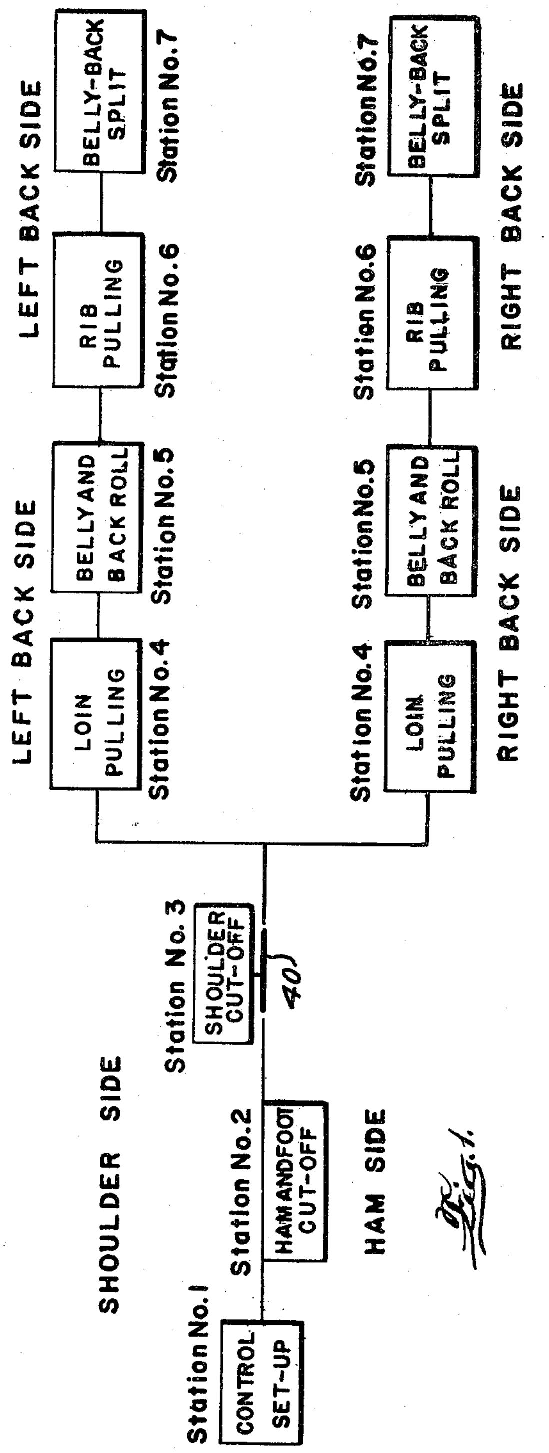

This invention relates to the break-up of irregular masses, and more particularly to the dividing or separating of masses by apparatus or process means through a series of successive steps. The invention is particularly useful in the break-up of animal carcasses of varying sizes and shapes.

The present application is a continuation-in-part of our copending application Serial No. 77,121 filed December 20, 1960.

For simplicity in description, the invention will be described in connection with the break-up of a hog carcass, but it will be understood that such description is by way of example only and that the invention is applicable to many other physical types of masses having irregular or varying shapes and sizes.

In the break-up of pork carcasses, it has been the practice to move the carcass halves along conveyors and perform the various cutting steps by manual operations, and such operations were regarded as necessary hand operations because of the great irregularities in the carcasses and the importance of recovering all of the valuable portions of the lean meat and other meat portions. For example, in the drawing of the valuable loin portion near the saddle of the hog, it is found that the saddle position in a short hog carcass is at an entirely different position from that in a long hog carcass, and a manual operation has been considered necessary in order to recover all of the loin from such irregular bodies. Further, the fat and lean portions vary in depth, the rib structures of the carcasses vary in size, and the operator has been obliged to change the line of the scribe cut and the U-shaped knife cut with each individual carcass. As a result of the foregoing, it has been necessary to employ a number of stations along a traveling belt at which operators are stationed for using cutting machines or tools in the break-up of the carcass.

If it were possible to provide mechanical means for performing the cutting operations, while at the same time providing sighting control means at the beginning of the break-up operation by which one or two operators could at the outset pre-select the elements and their positioning at the various stations for a particular carcass so that as the carcass traveled through the apparatus the cutting elements were automatically positioned for dividing the carcass in a manner responsive to the pre-selection at the first station, a great saving in time, labor and expense would be achieved.

An object, therefore, of the present invention is to provide means and method by which irregular and varying masses may be divided or separated during successive operations. A further object is to provide apparatus or means in which an animal carcass or other mass is divided or separated by a mechanism in which the dividing means is moved relatively to the carcass or the carcass is moved relative to the dividing means, or both are moved relative to each other in a sequence of operations. A still further object is to provide apparatus by which an elongated object or mass may be moved first in a sidewise path of travel, which path is intercepted by means for removing an end portion or portions of the mass and then turned and moved in an endwise path of travel, which path is intercepted for the removal of a portion of the mass during the longitudinal travel. A still further object is to provide new and improved apparatus for performing separating operations on animal carcasses and other objects. Other specific objects and advantages will appear as the specification proceeds.

The invention is shown in an illustrative embodiment by the accompanying drawings, in which—

Figure 2:
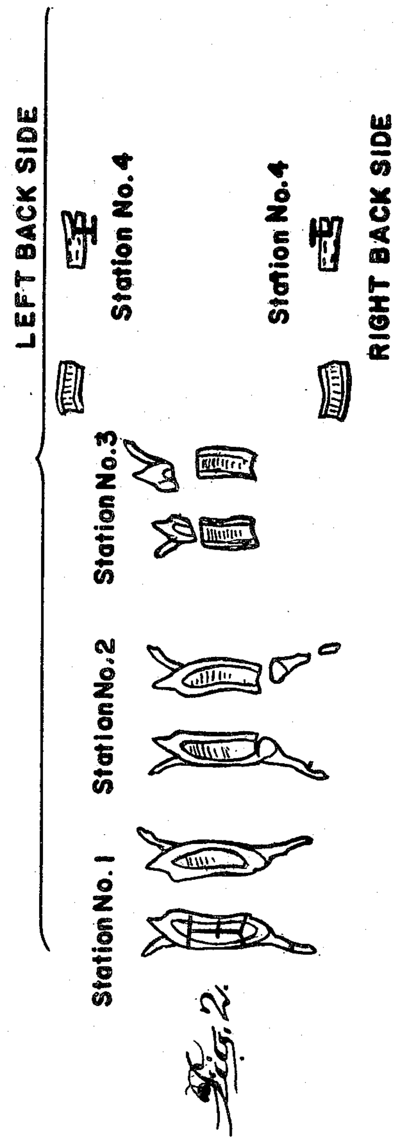
Figure 3:
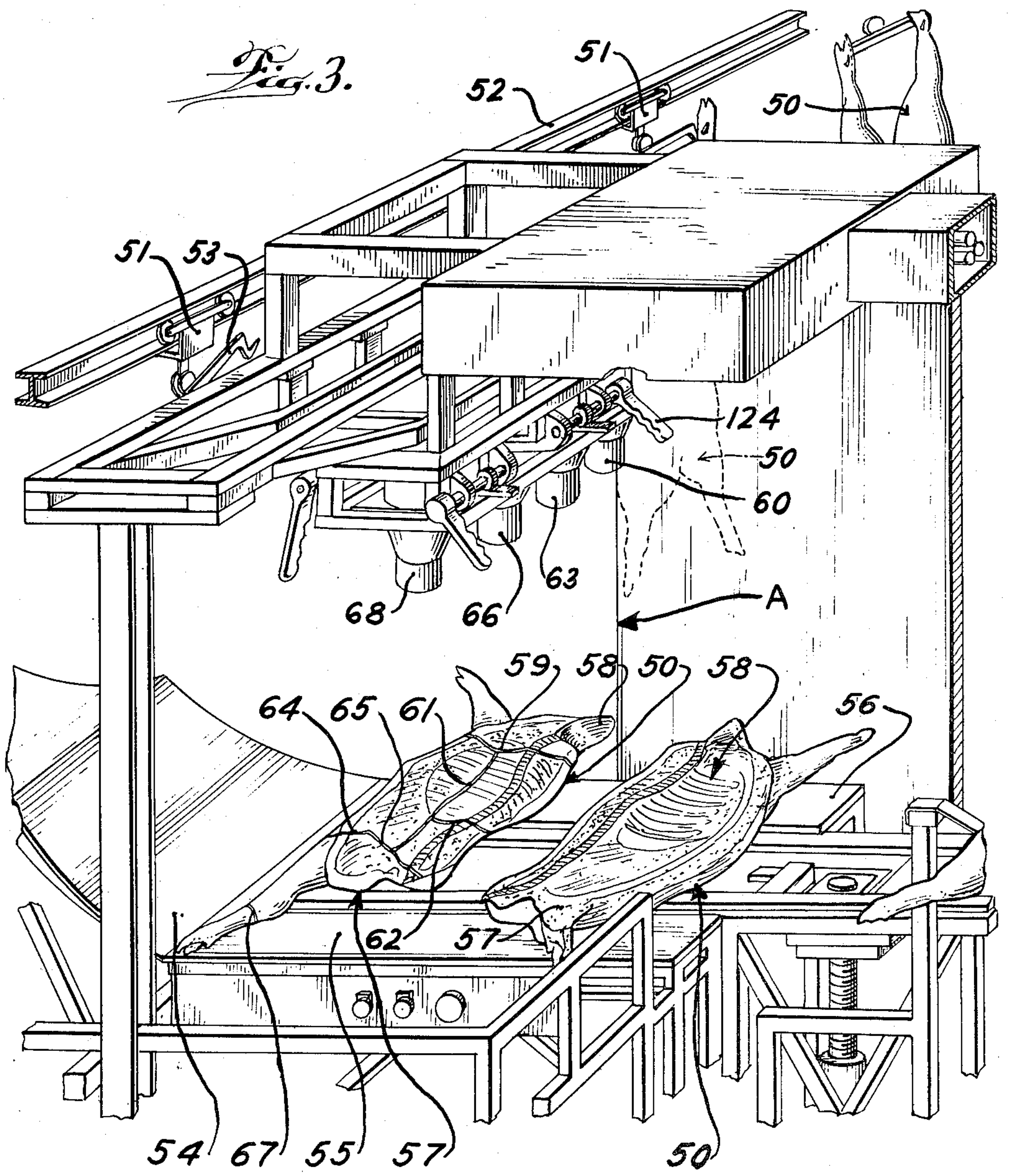
Figure 4:
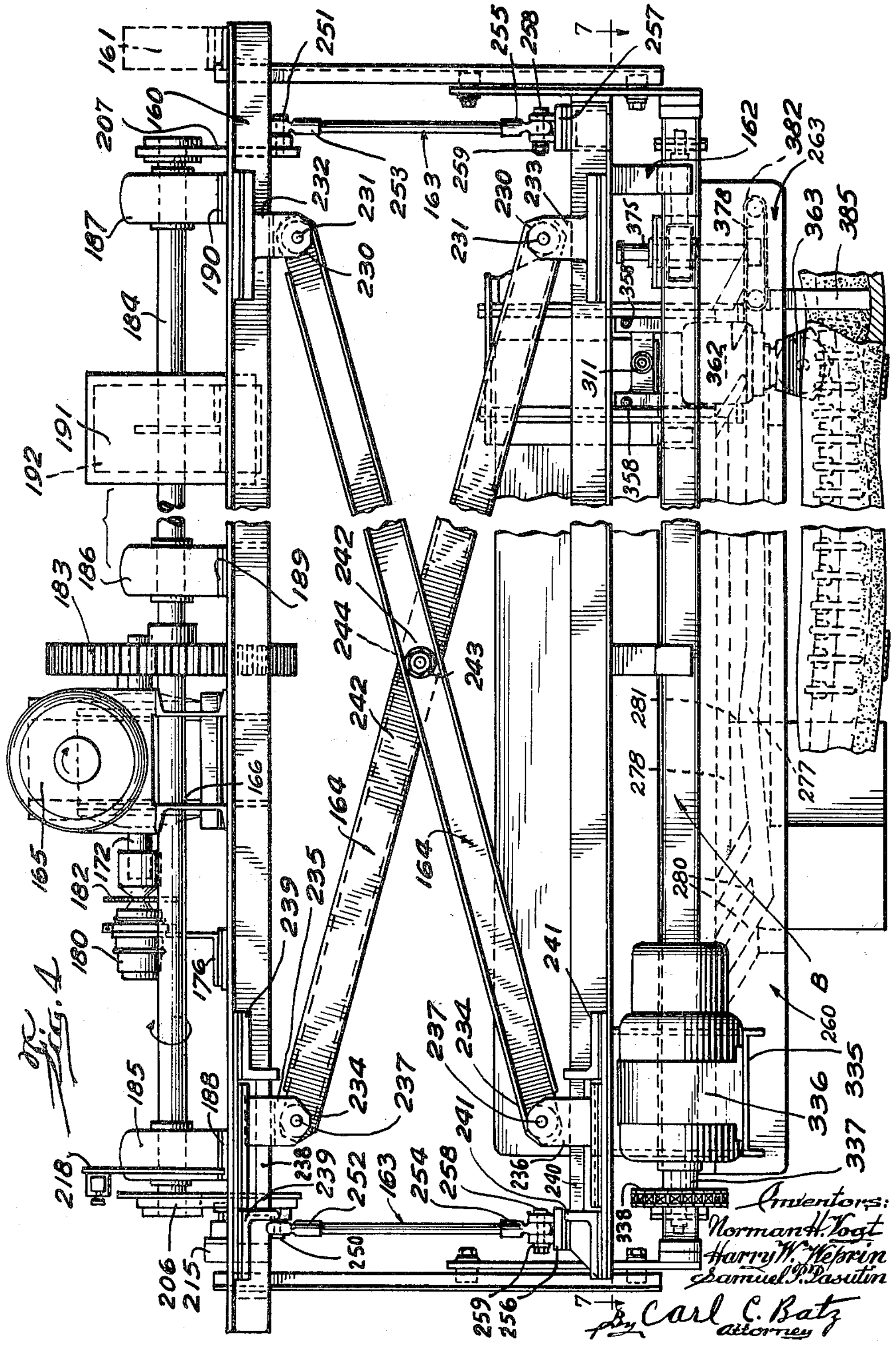
Figures 5, 32, 33:
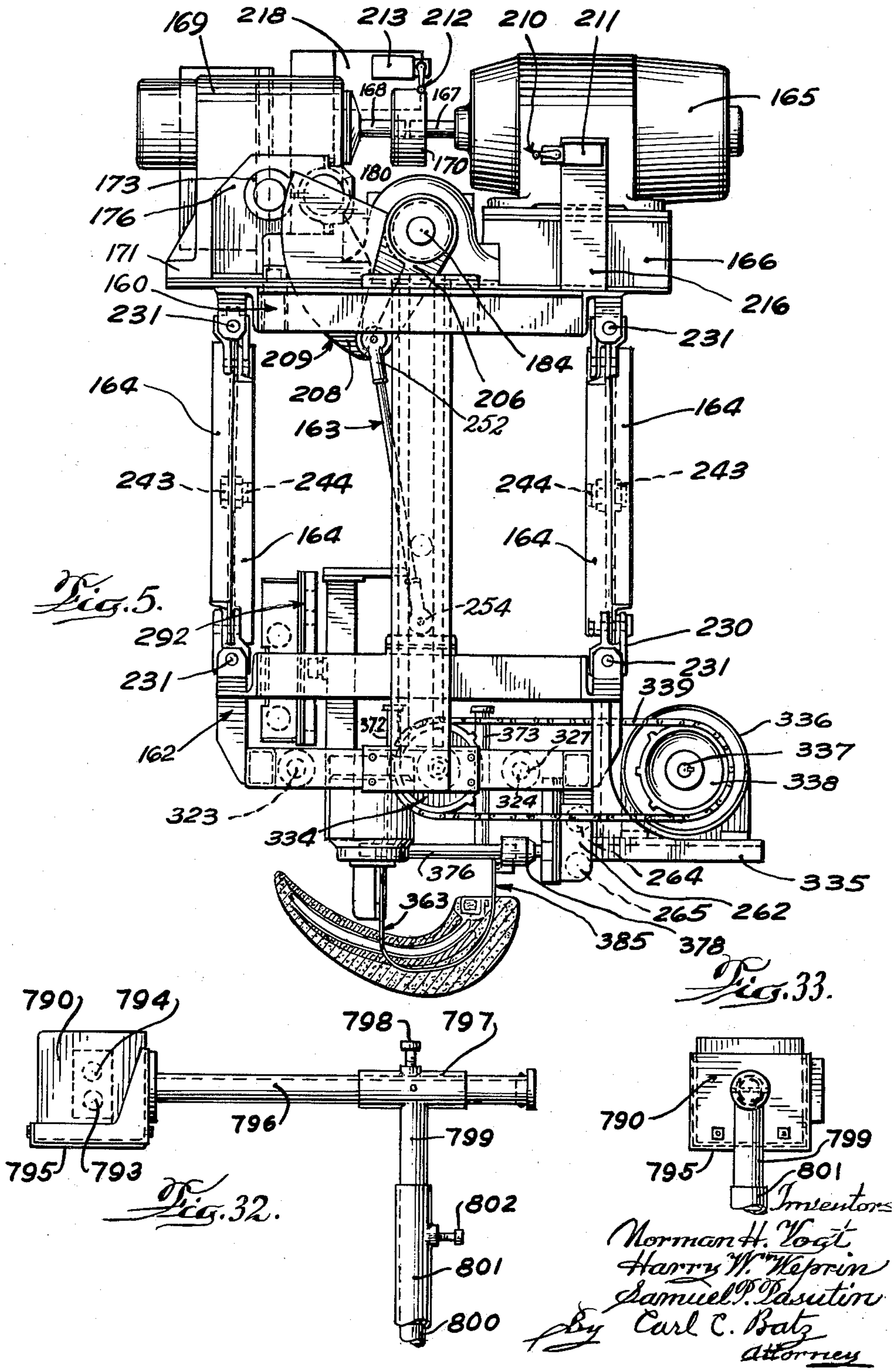
Figure 6:
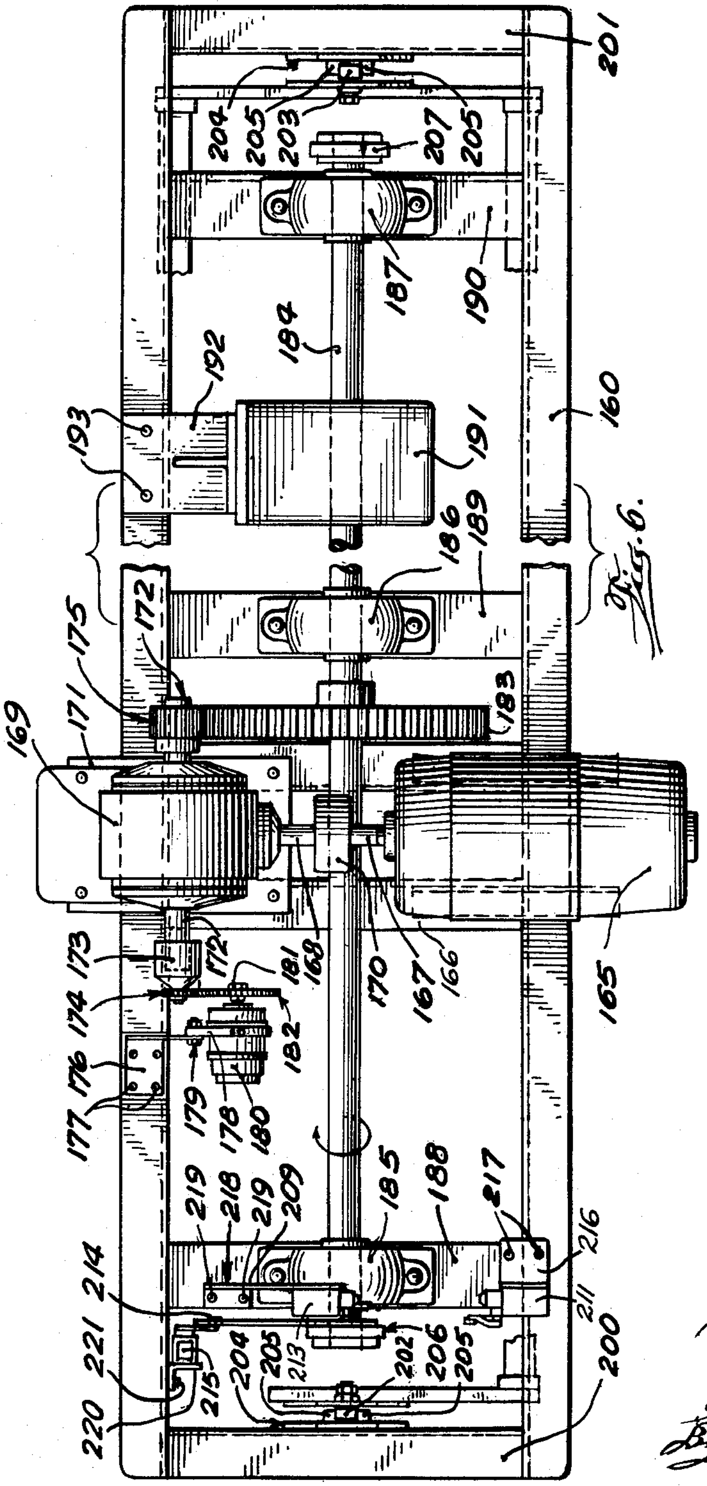
Figure 7:
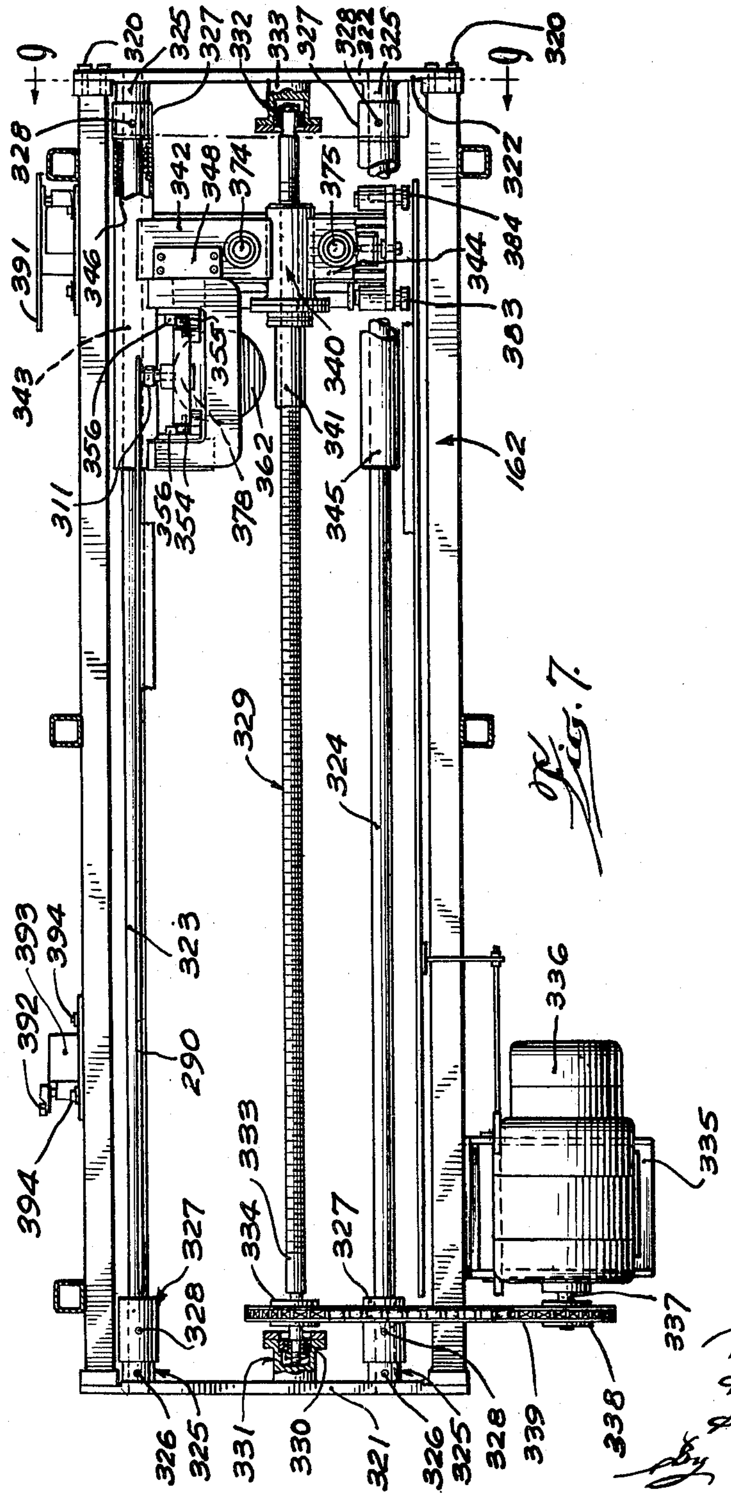
Figure 8:
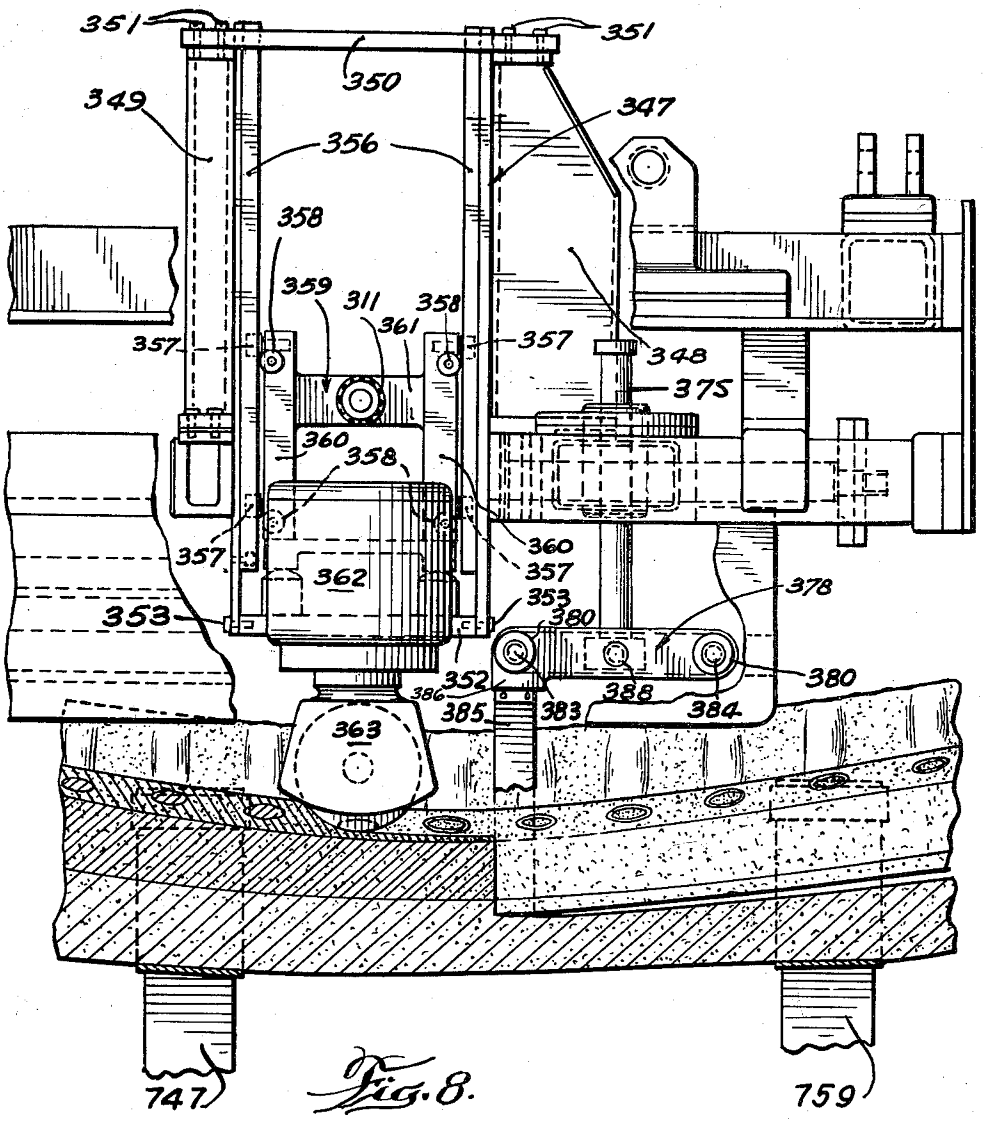
Figure 9:
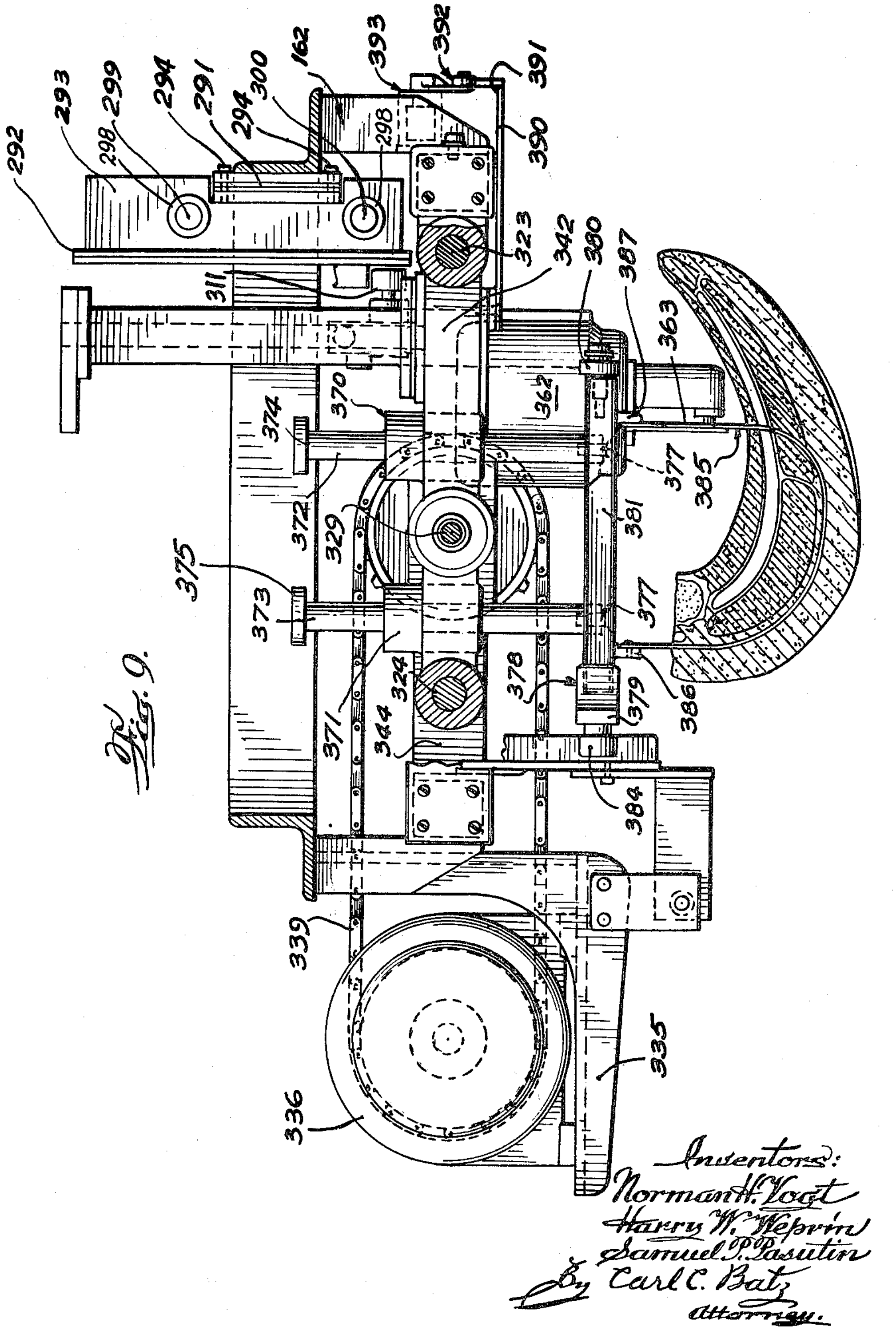
Figure 10:
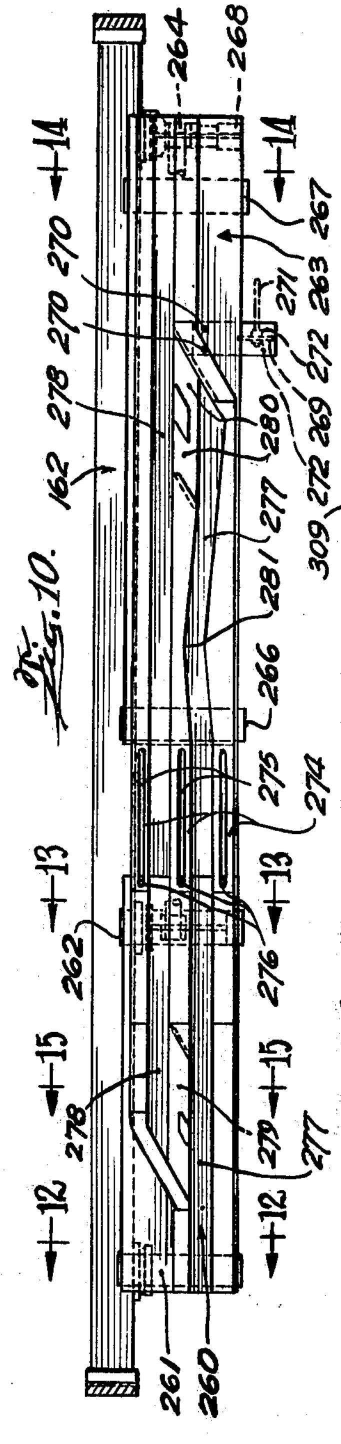
Figure 11:
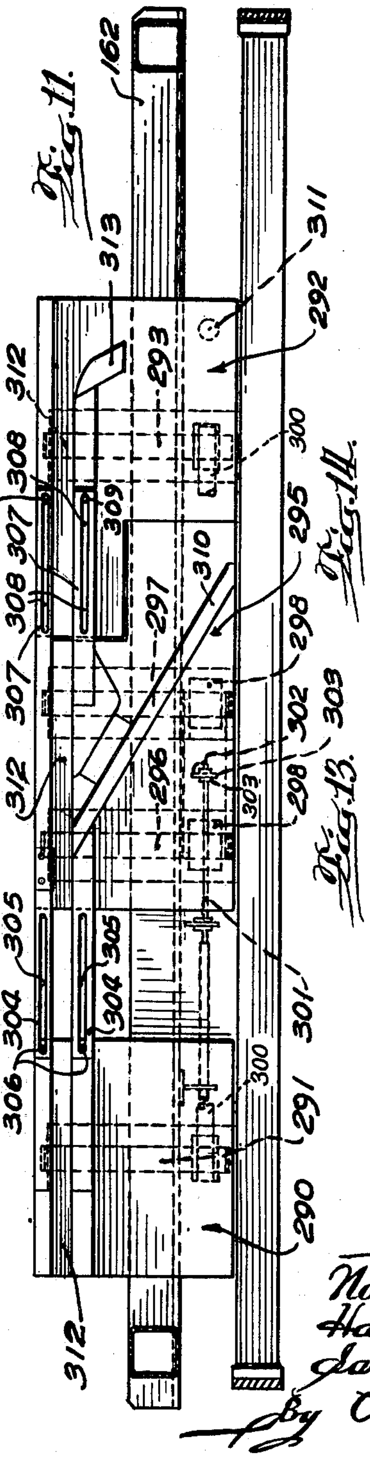
Figure 15:
Figure 14:
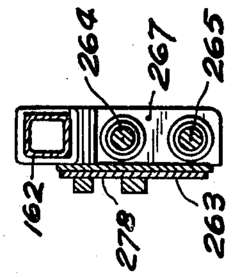
Figure 13:
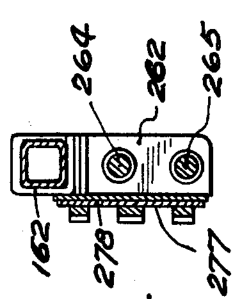
Figure 12:
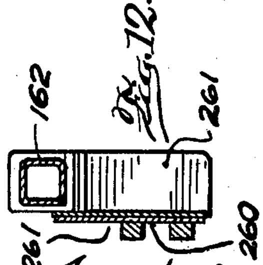
Figure 16:
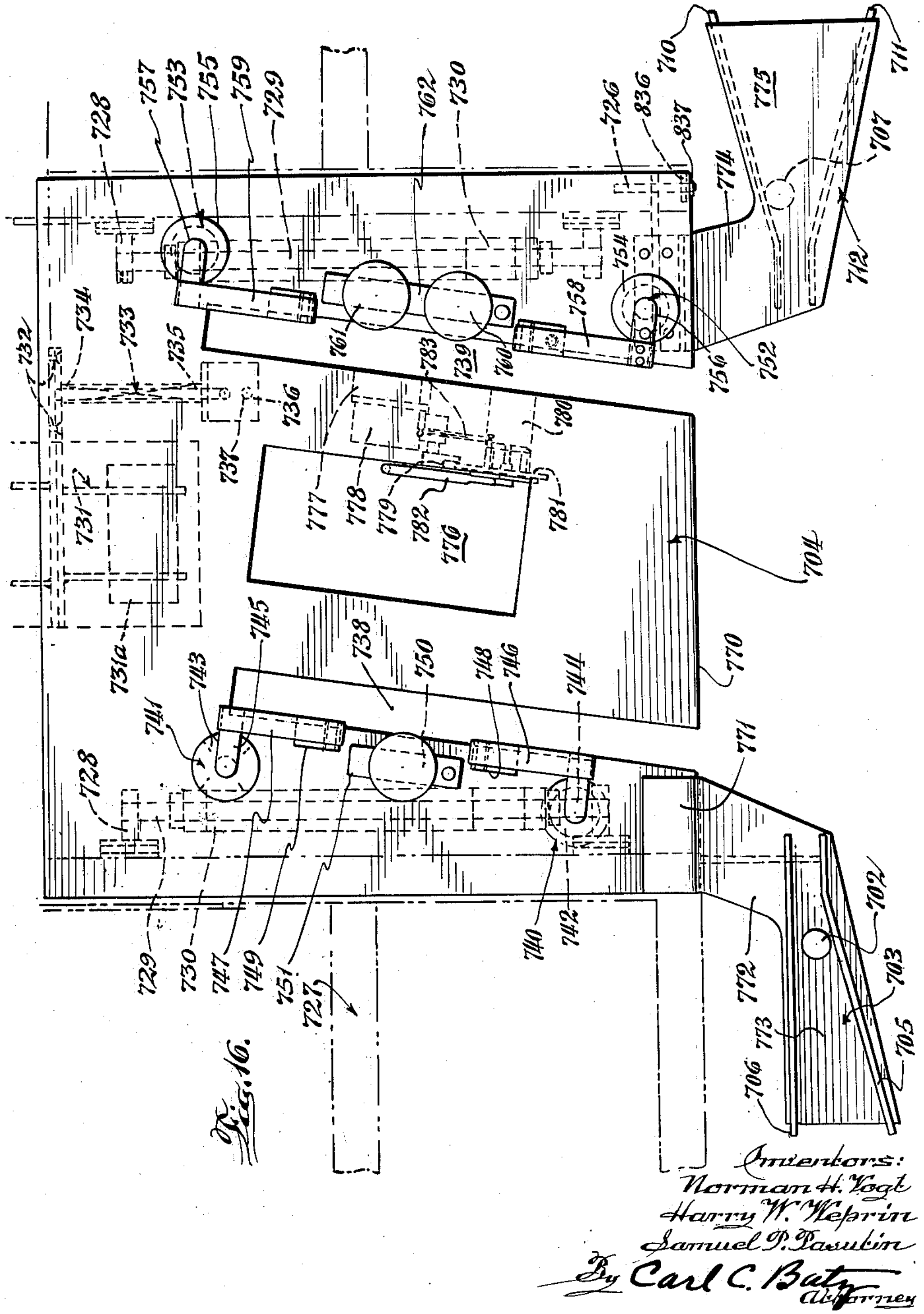
Figure 17:
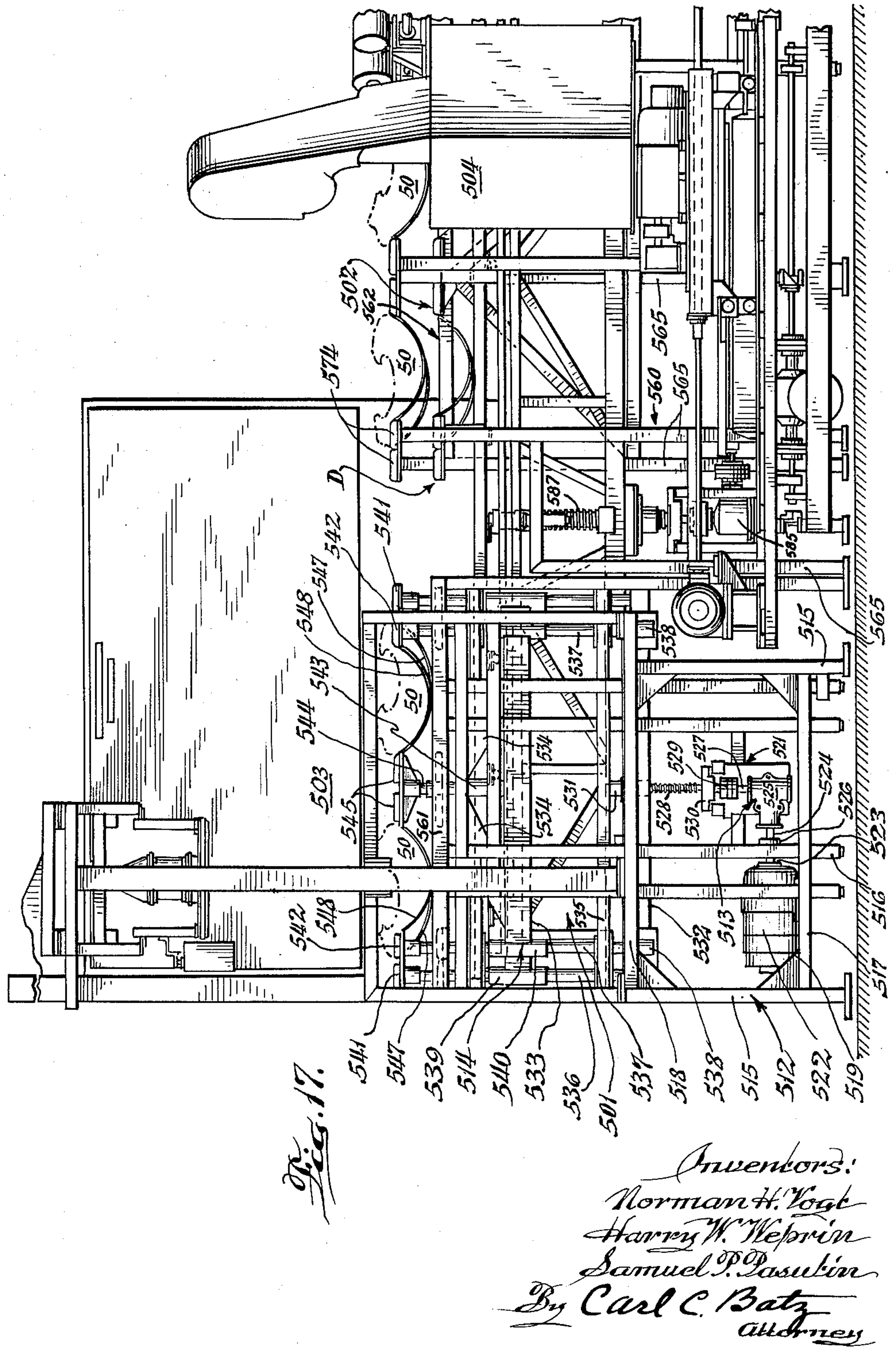
Figure 18:
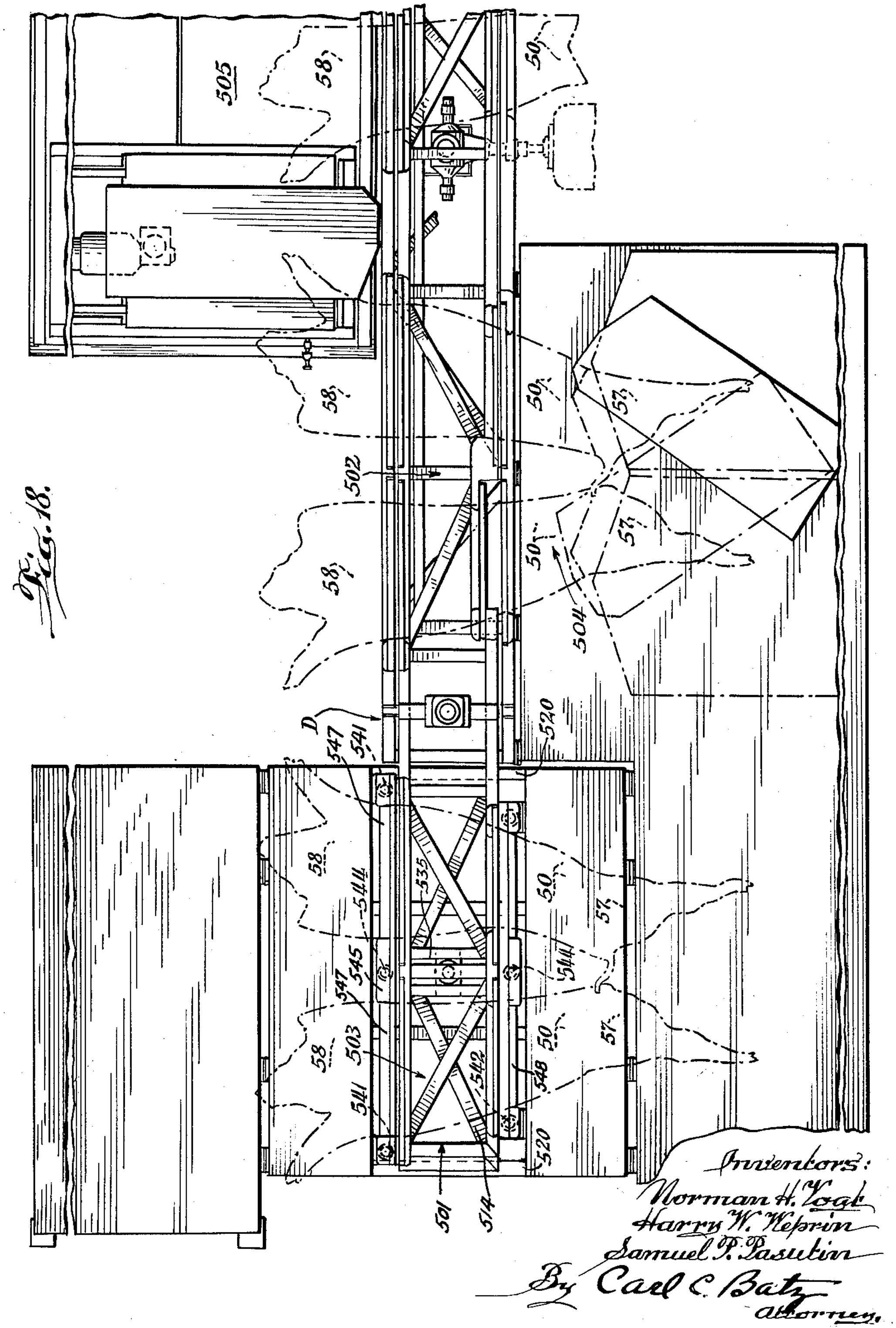
Figure 19:
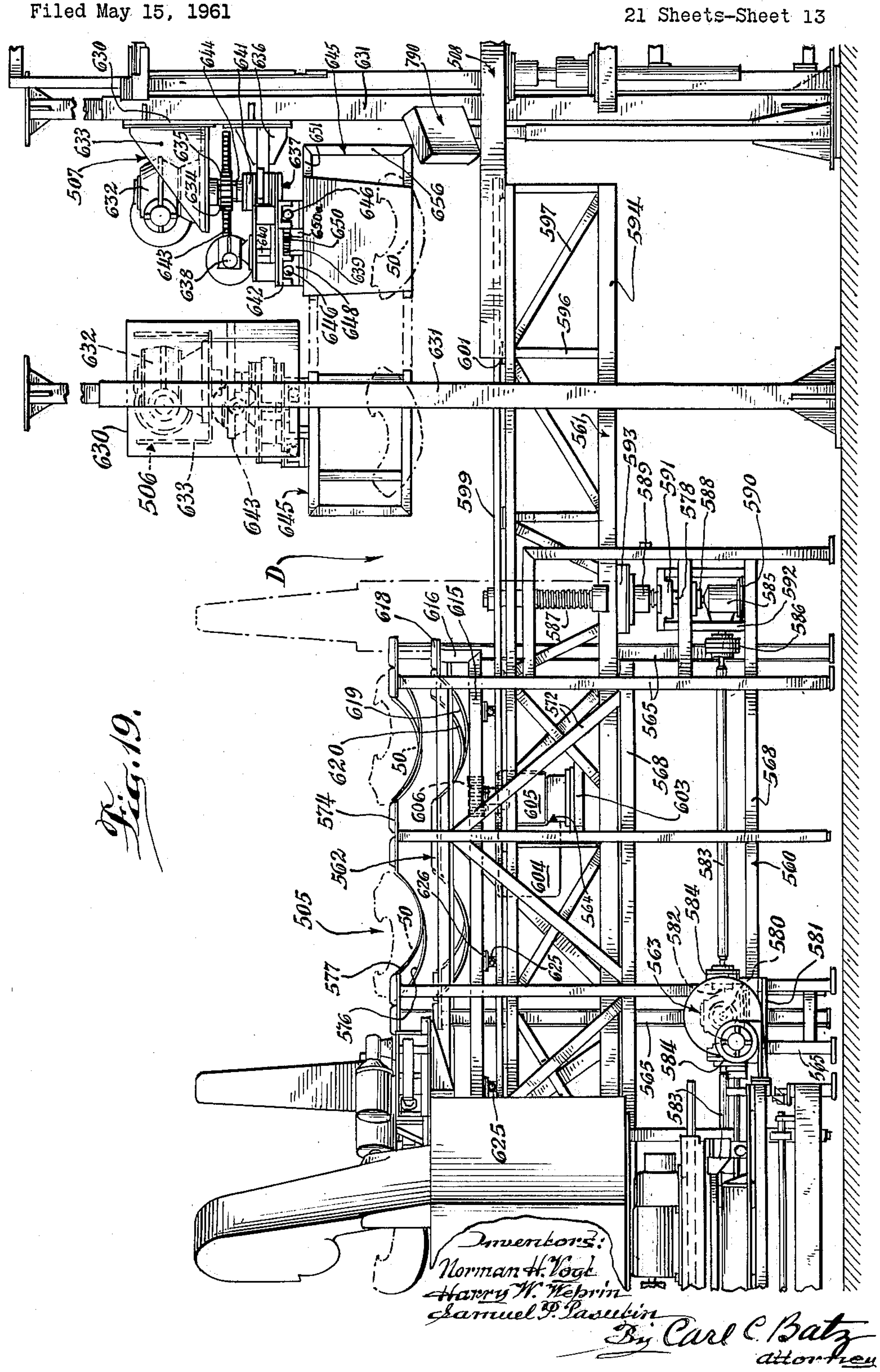
Figure 20:
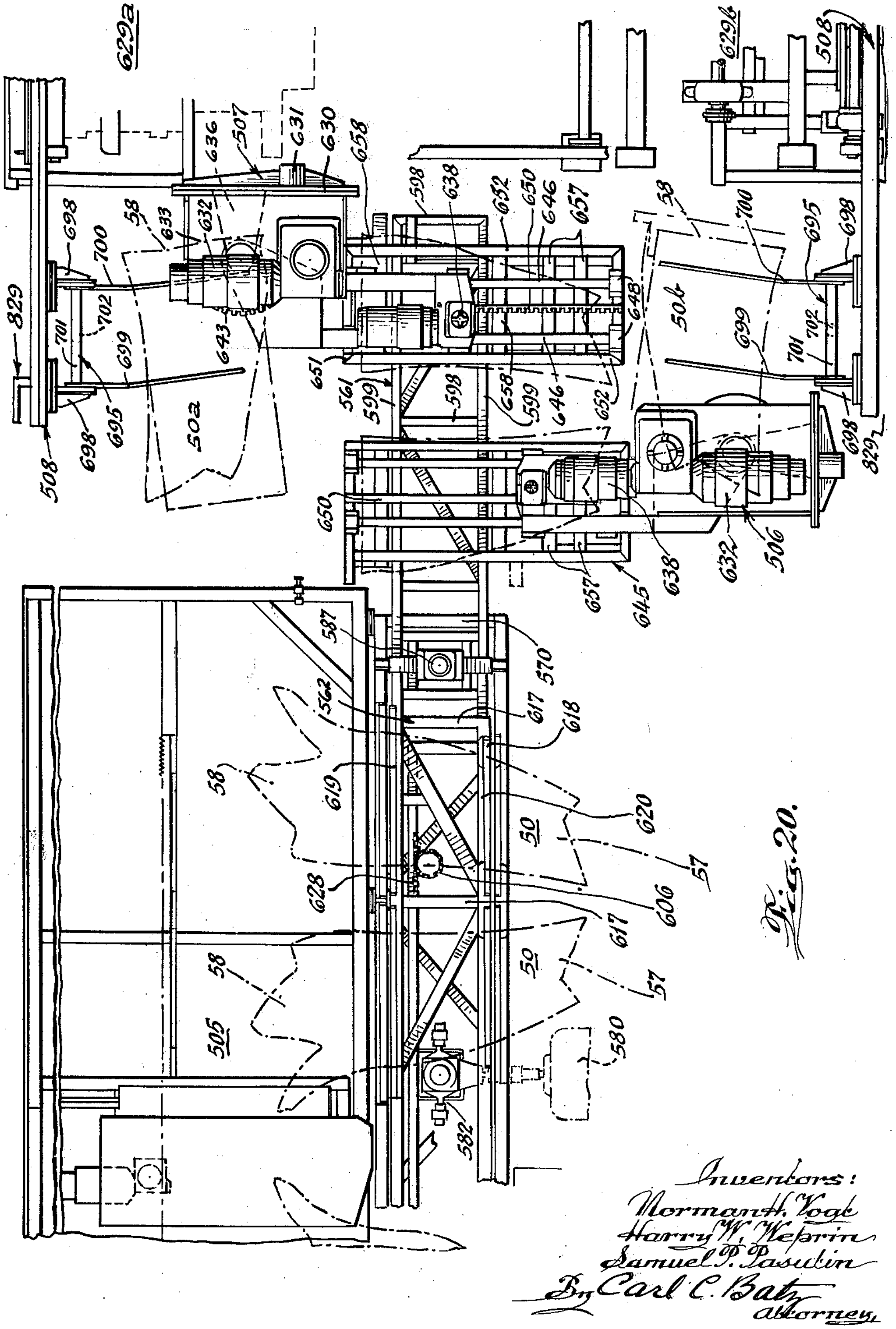
Figure 21:
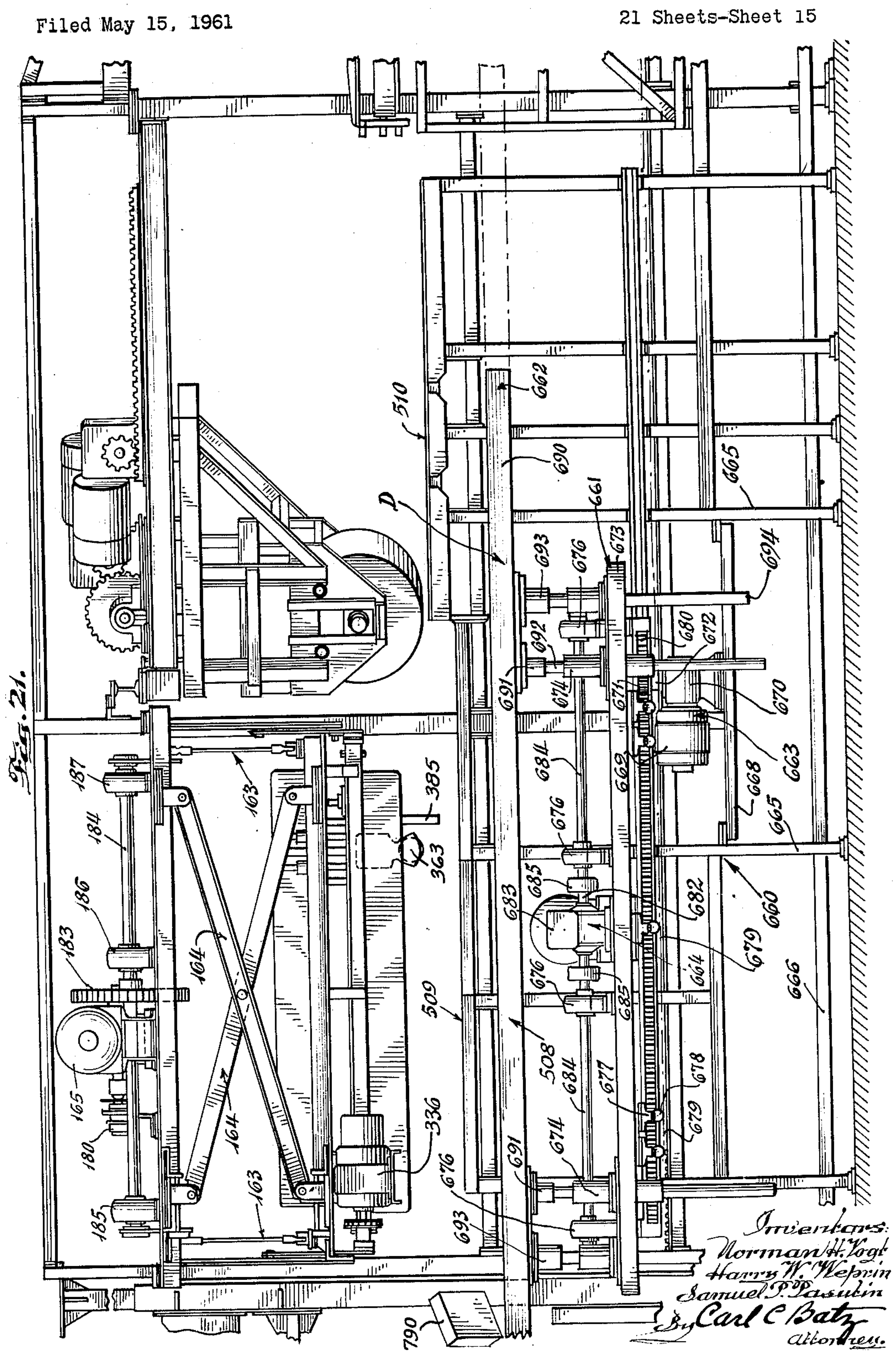
Figure 22:
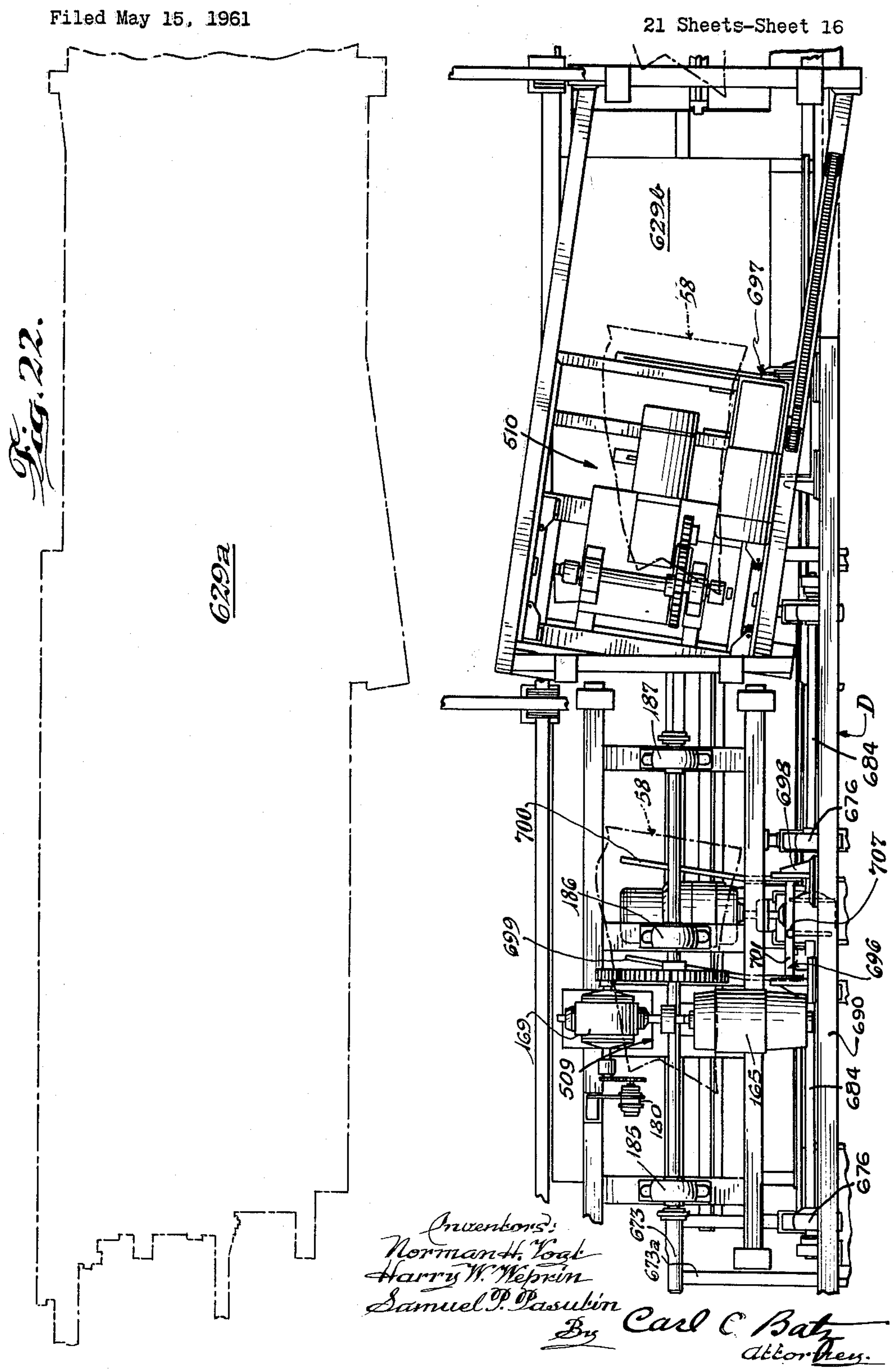
Figure 23:
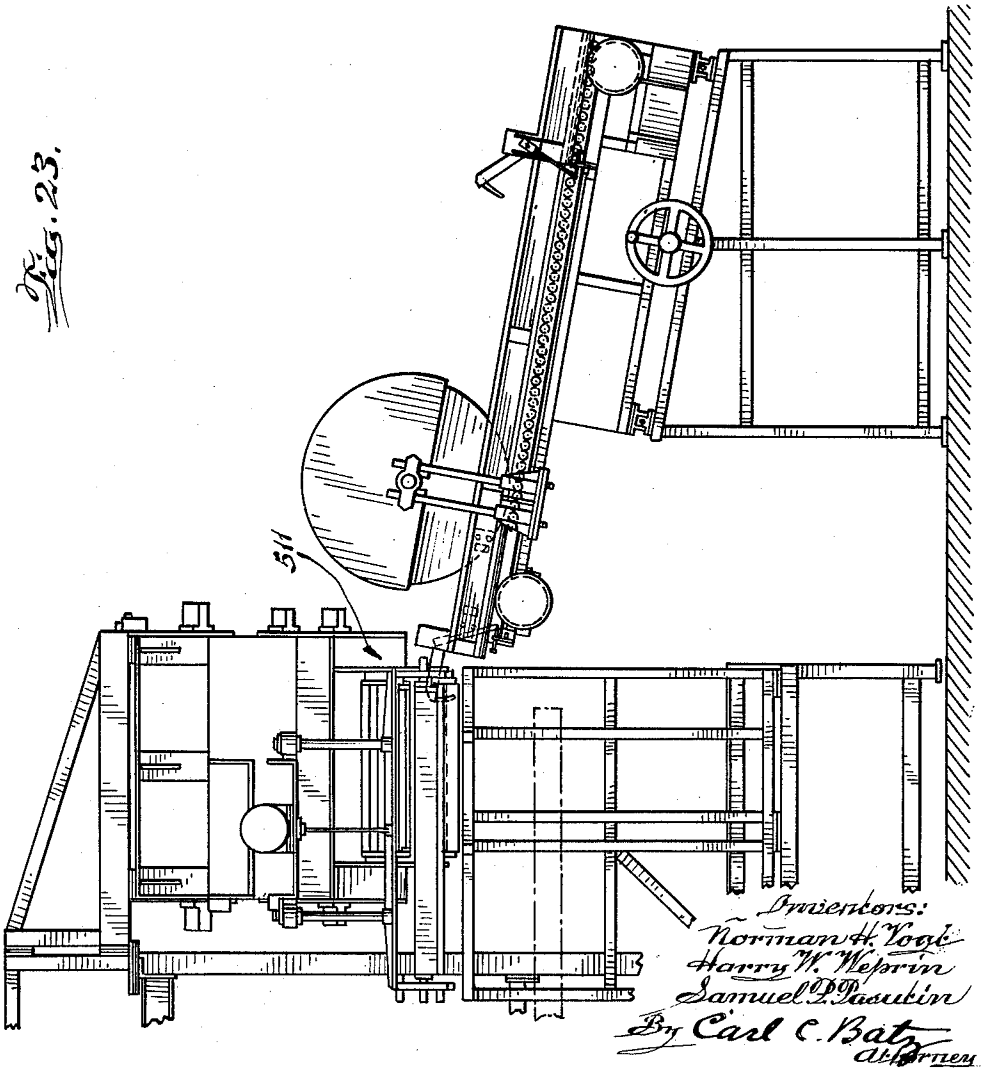
Figure 24:
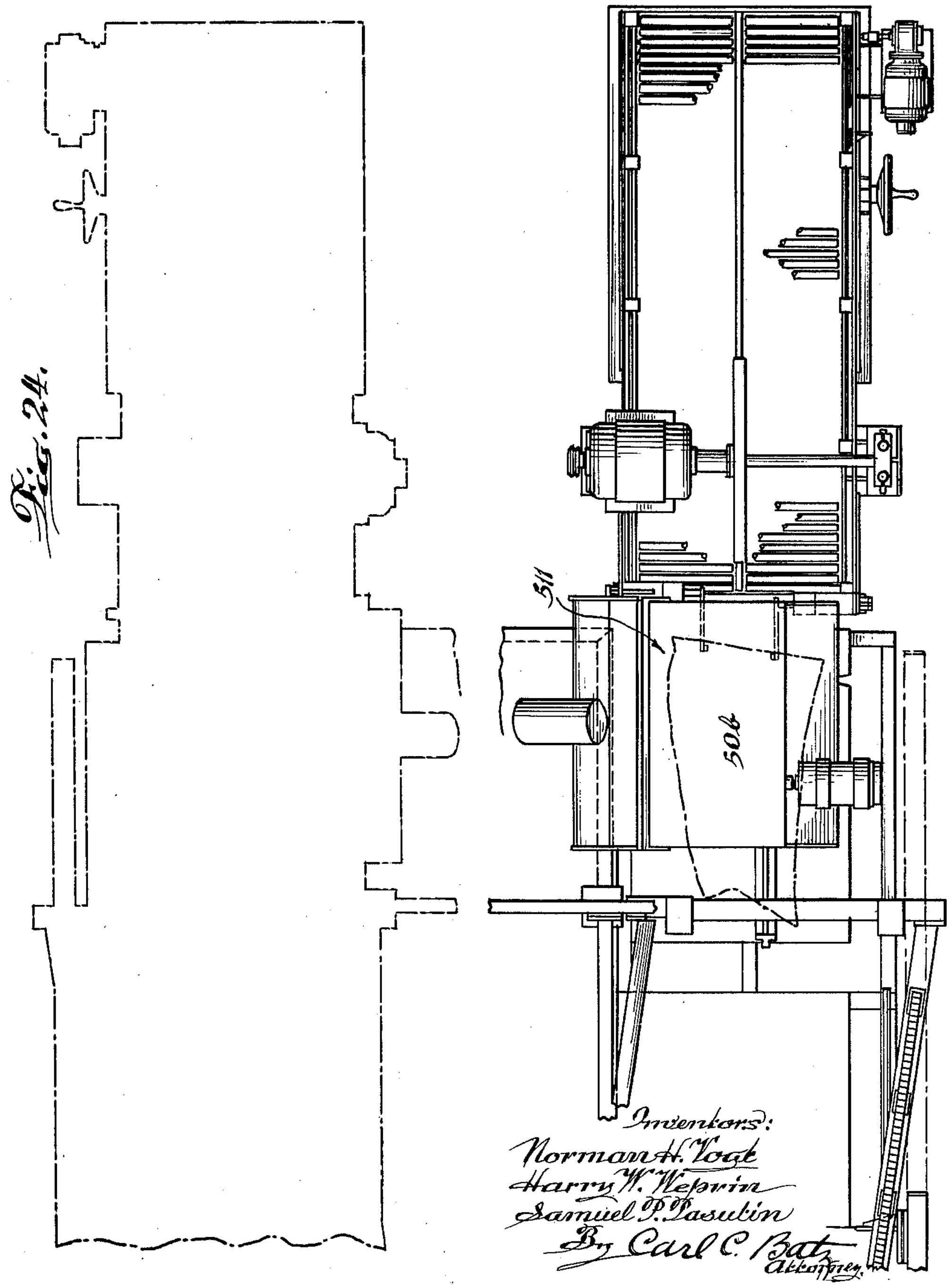
Figure 25:
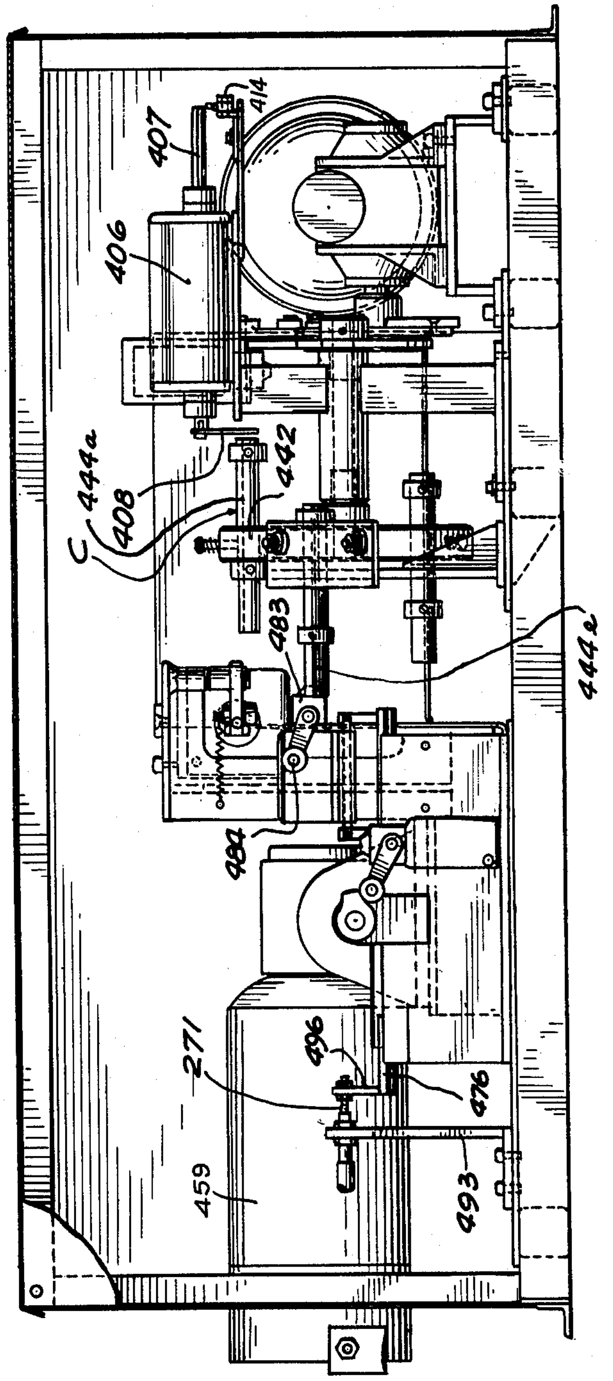
Figure 26:
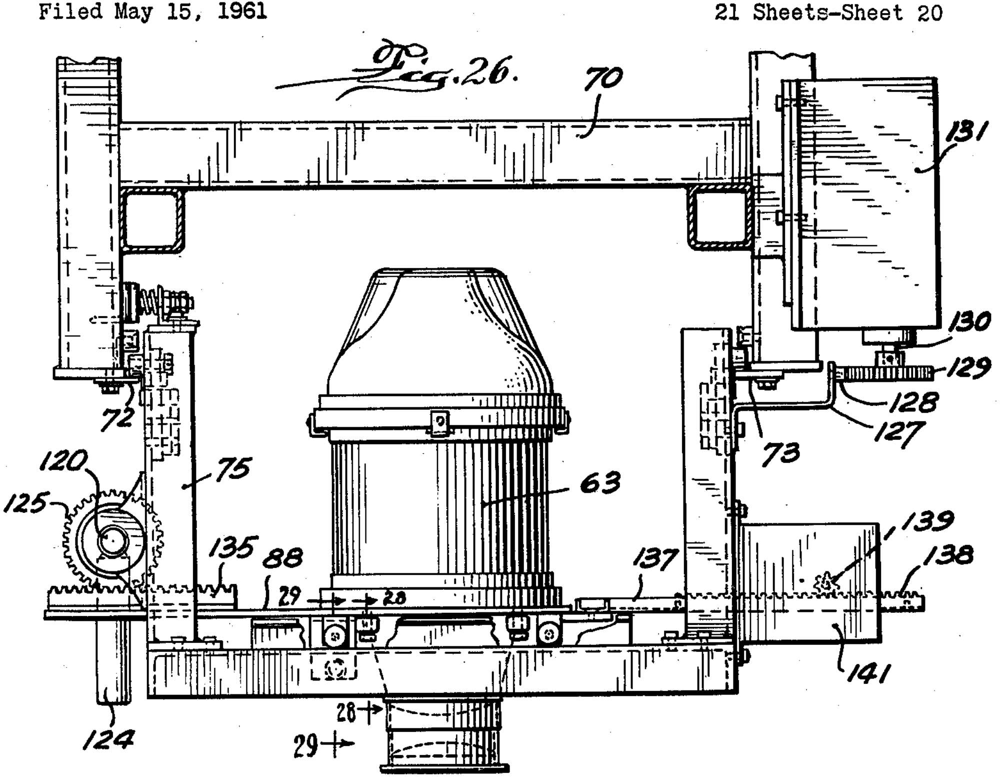
Figures 27, 28, 29:
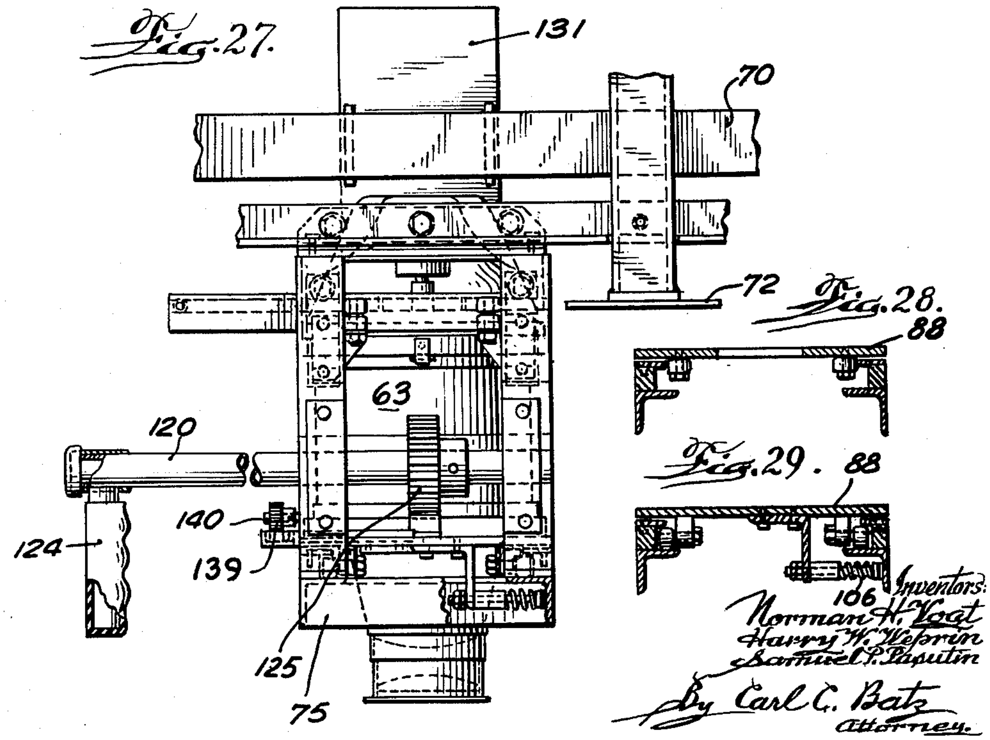
Figure 30:
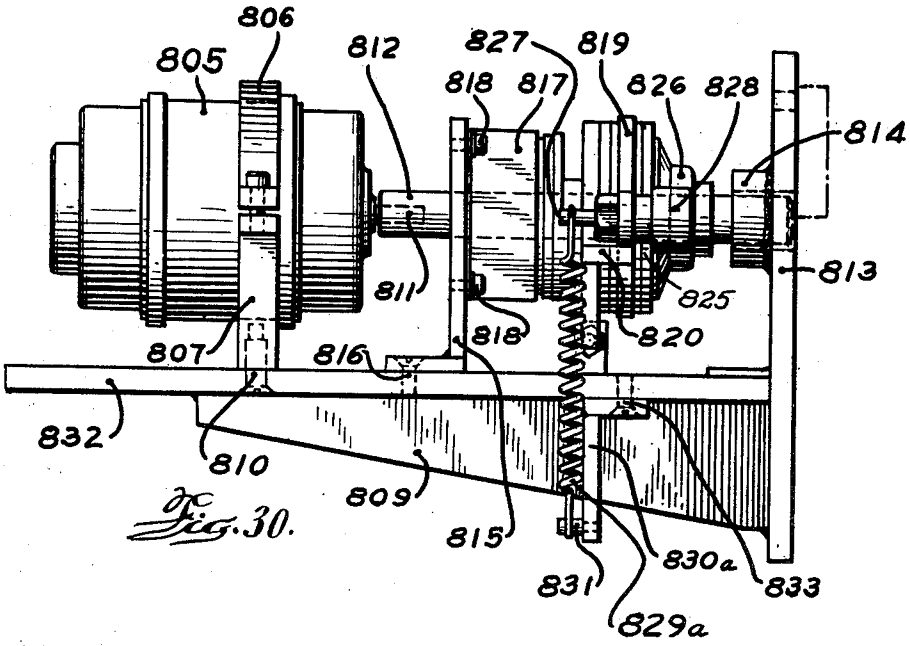
Figure 31:
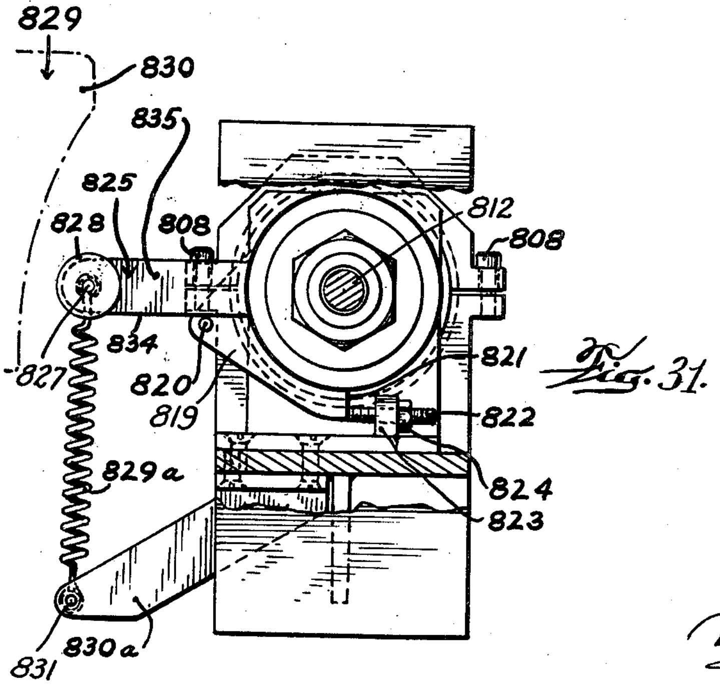

FIG. 1 is a diagrammatic showing of the sequence of operations performed by the apparatus and method of our invention; FIG. 2, a diagrammatic top plan view of pork carcass halves at successive stations; FIG. 3, a perspective view, taken at the beginning or inlet of the apparatus, and showing the positioning of the carcass halves during the alignment or sighting operation; FIG. 4, a side view in elevation of the loin-pulling apparatus and the mechanisms for vertically adjusting the same; FIG. 5, an end view, partly in section, of the carcass and loin-pulling mechanism; FIG. 6, a top plan view of the structure shown in FIG. 5; FIG. 7, a detailed sectional view, the section being taken as indicated at line 7—7 of FIG. 4; FIG. 8, a broken, enlarged, detailed view showing the scribe saw and loin-pulling knife and the operating mechanism therefor; FIG. 9, an enlarged, part sectional view, the section being taken as indicated at line 9—9 of FIG. 7; FIG. 10, a detailed view in side elevation of the cam means for operating the loin-pulling knife; FIG. 11, a view similar to FIG. 10, showing the cam means for operating the scribe saw; FIG. 12, an enlarged detailed sectional view, the section being taken as indicated at line 12—12 of FIG. 10; FIG. 13, an enlarged detailed sectional view, the section being taken as indicated at line 13—13 of FIG. 10; FIG. 14, an enlarged detail sectional view, the section being taken at line 14—14 of FIG. 10; FIG. 15, an enlarged detailed sectional view, the section being taken as indicated at line 15—15 of FIG. 10; FIG. 16, a plan view of the hog side positioning table used in the loin-pulling operation; FIG. 17, a broken, side elevation view of the conveyor mechanism at Stations No. 1 and 2; FIG. 18, a broken, top plan view of the conveyor mechanism at Stations No. 1 and 2; FIG. 19, a broken, side elevation view of the conveyor mechanism at Station No. 3 and the turn-around; FIG. 20, a broken, top plan view of the conveyor mechanism at Station No. 3 and the turn-around; FIG. 21, a broken, side elevation view of the conveyor mechanism at right half Stations No. 4 and 5; FIG. 22 a broken, top plan view of the conveyor mechanism at right half Stations No. 4 and 5, the left half stations being outlined by phantom lines; FIG. 23, a broken, side elevation view of the conveyor mechanism at right half Stations No. 6 and 7; FIG. 24, a broken, top plan view of the conveyor mechanism at right half Stations No. 6 and 7, the left half stations being outlined by phantom lines; FIG. 25, a side elevational view of a Geneva movement delay control mechanism for operating the cam adjustments controlling the movement of the scribe saw, loin-pulling knife and loin-pulling table; FIG. 26, a broken front view in elevation of the sighting mechanism at the first station of the apparatus; FIG. 27, a broken, side view of the structure shown in FIG. 26; FIG. 28, a sectional view, the section being taken as indicated at line 28—28 of FIG. 26; FIG. 29, a sectional view, the section being taken as indicated at line 29—29 of FIG. 26; FIG. 30, a side view in elevation of a selsyn motor control device; FIG. 31, an end view in elevation (with parts broken away) of the structure shown in FIG. 30; FIG. 32, a broken side elevational view of a color-responsive control device for controlling the depth of a cut of the loin-pulling knife; FIG. 33, an end view in elevation of the structure shown in FIG. 32.

In the embodiment of our invention illustrated in the foregoing drawings, A designates the sighting or alignment mechanism which is manipulated by the operator or operators to bring the lines of light into the desired positions for break up of the carcass; B designates the loin-pulling mechanism at the fourth station of operation; C designates delay control means whereby carcass moving and dividing elements at the loin pulling station are moved into the desired relative position for dividing the carcass, in response to a selection made at the first station by the sighting mechanism for this particular carcass, such control mechanism being responsive to the alignment made at the first station but delaying action until the carcass in question reaches the loin pulling station; and D designates the automatic conveyor mechanism which is used to carry hog carcasses through the entire break up operation.

Referring to FIGS. 1 and 2, the control setup or sighting station A may be designated as the first station. Following this there is a ham and foot cut-off station which may be referred to as the second station. There is a shoulder cut-off station in which a saw 40 is provided and which may be referred to as the third station. Pork halves, which have been moved transversely as indicated in FIG. 2 through Stations 1, 2 and 3 for the removal of the ham and foot on one side and the shoulder on the other side, are then separated, one of the halves, containing the belly and back, being moved laterally to the right and the other similar half being moved to the left and passed through the separate operations indicated in FIG. 1, namely, the loin pulling operation, which may be referred to as Station 4, the belly and back roll operation which may be referred to as Station 5, a rib pulling operation which may be referred to as Station 6, and a belly and back split which may be referred to as Station 7.

In the operation illustrated diagrammatically in FIG. 1, the carcass halves or portions may be moved in any manner through the various stations and the operations are carried on as described. We prefer, however, to employ an automatic conveyor mechanism which will carry the carcass or parts thereof through the various operations. A preferred embodiment of an automatic conveyor mechanism will be described in detail.

*Automatic Conveyor Mechanism*

The conveyor or transfer mechanism is illustrated in detail in FIGS. 17 through 24. The conveyor mechanism D includes at least four distinct mechanisms for carrying hog carcasses 50 along the entire break-up operation.

Mechanism No. 1, generally designated as 501, is designed to lift carcasses 50 into a raised position.

Mechanism No. 2, generally designated as 502, is designed to lift and transfer hog carcasses 50 from Station No. 1, the control setup, generally designated as 503, to Station No. 2, the ham and foot cut-off, generally designated as 504, from Station No. 2 to Station No. 3, the shoulder cut-off, generally designated as 505, and from Station No. 3 to mechanism 3, which includes left half and right half turn mechanisms 506 and 507.

Mechanism No. 3 is designed to pick up each half of carcass 50 from transfer mechanism 502 and transfer carcasses 50 to mechanism No. 4, generally designated as 508.

Mechanism No. 4, designated as 508, is designed to separately pick up each half of carcass 50 from mechanism No. 3, including turn mechanisms 506 and 507, and transfer the carcasses 50 to Station No. 4, loin-pulling, generally designated as 509, from Station No. 4 to Station No. 5, the belly and back roll station, generally designated as 510, and from Station No. 5 to Station No. 6, the rib pulling station, generally designated as 511.

Referring particularly to FIGS. 17 and 18, mechanism 501 is composed generally of stationary support frame, generally 512, lift drive means, 513, and moving frame, generally 514.

Stationary support 512 includes legs 515 and 516, longitudinal supports 517 and 518, and transverse supports

520, shown in FIG. 18. Motor mounting plate 519 is fixedly secured to longitudinal supports 517, and gear unit mounting assembly 521 is secured to support frame 512.

Lift drive means 513 includes motor 522, which is mounted on plate 519, and gear unit 525 whose shaft 524 is connected to motor shaft 523 by coupling 526. Shaft 527 of gear unit 525 is coupled to screw 528 by coupling 529, ball screw 528 being rotatably mounted in bearing 530 of assembly 521. Screw 528 also threadably engages nut 531.

Moving frame 514 includes longitudinal supports 532 and 533, and angled supports 534. Plate 535, as shown in FIG. 18, is secured to nut 531. Guide rods 536 and 537 are secured to longitudinal supports 532 by mounting 538. Hollow tubes 539 are secured around guide rods 536 and hollow tubes 540 are secured around guide rods 537, hollow tubes 539 and 540 being fastened to longitudinal supports 533. Guide rods 536 and 537 are provided with strap supports 541 and 542. Angle supports 534 are secured to longitudinal supports 533 and also to hollow tubes 543 which are secured around guide rods 544. Strap supports 545 are secured to the top of guide rods 544. Shoulder end straps 547 are secured to supports 541 and 545 and ham end straps 548 are secured to supports 542 and 545.

In describing mechanism No. 2, reference will be made particularly to FIGS. 17, 18, 19 and 20. Mechanism No. 2, generally designated as 502, comprises stationary support frame, generally 560, vertical moving frame, generally 561, horizontal moving frame, generally 562, vertical drive means, generally 563, and horizontal drive means, generally 564.

Stationary support frame 560 is provided with legs 565, longitudinal supports 568, transverse supports 570, and angle supports 572. At the top of legs 565 are strap supports 574, shoulder end support straps 576 and ham end support straps 577 being mounted to supports 574.

Vertical drive means 563, shown most clearly in FIG. 19, has motor 580 secured to mounting plate 581 which is secured to support frame 560. Motor shafts 582 are coupled to drive shafts 583 by couplings 584. Drive shafts 583 in turn are coupled to right angle gear drives 585 by couplings 586. Angle gear drives 585 are coupled to shafts 578 of screws 587 by couplings 588. Ball screws 587 threadably engage nuts 589. Gear drives 585 are fixedly secured to frame 560 by plates 590. Shafts 578 of ball screws 587 are rotatably mounted in bearings 591, which are fixedly secured to supports 592 of support frame 560.

Referring particularly to FIG. 19 and FIG. 20, vertical moving frame 561 is secured to ball nut assembly 589, as at 593. Vertical moving frame 561 includes longitudinal supports 594, vertical supports 596, angle supports 597, and transverse supports 598. Tracks 599 are mounted on longitudinal supports 594, as on spacers 601.

Mounted on vertical moving frame 561 is horizontal drive means 564, which is mounted on frame 561 by plate 603. Drive means 564 includes motor 604, right angle gear drive 605 and gear 606.

As shown most clearly in FIGS. 19 and 20, horizontal moving frame 562 includes longitudinal supports 615, legs 616 and transverse supports 617. Mounted on legs 616 are strap supports 618, which provide mountings for shoulder end straps 619 and ham end straps 620. Rollers 625 are rotatably mounted in bearings 626 which are secured to longitudinal supports 615. Rollers 625 are adapted to ride on tracks 599 of frame 561. As shown more clearly in FIG. 20, gear rack 628 is secured to frame 562, rack 628 being adapted to engage gear 606 of horizontal drive means 564 (motor 604 and angle gear drive 605 not being shown in FIG. 20).

Referring to FIGS. 19 and 20, mechanism No. 3, including turn mechanisms 506 and 507, transfers hog carcasses 50 from a position transverse to the flow of carcasses to a position longitudinal to the flow, with shoulder ends 58 leading. The left half 50*a* of a hog carcass is picked up by mechanism 507 from horizontal moving frame 562 and is rotated approximately 90° (actually about 82°). Mechanism 506 picks up right half 50*b* of a corresponding hog carcass from frame 562 and rotates it approximately 90° (actually about 98°). Mechanism 507 rotates the left half 50*a* in a clockwise direction and mechanism 506 rotates right half 50*b* clockwise, so both shoulder ends 58 are leading.

Since mechanisms 506 and 507 operate in substantially the same manner, there will be a detailed description of mechanism 507 only. Mechanism 507 actually imparts two movements to left half 50*a*, one movement retracting half 50*a* from horizontal frame 562 and the second movement rotating the carcass clockwise approximately 90°. Mechanism 507 is secured to mounting 630 which is attached to vertical support 631. Motor 632 is secured to mounting 633 which is fastened to plate 630, gear 635 being secured on shaft 634 of motor 632. Support 636 is attached to plate 630 and rotatably supports motor arm 637, which has secured to it motor 638. Gear 639 (partially shown in FIG. 19) is secured to shaft 640 of motor 638. Bearings 641 provide rotatable support for motor arm 637 on support 636. Large gear 643 is fixedly secured to arm 637 by shaft 644. Gear 643, as shown best in FIG. 19, rotates on bearings 641 and meshes with gear 635 on motor shaft 634. Also supported on arm 637 is basket 645 which is slideably positioned on the underside of arm 637. Four supports 642 are fixedly secured to the underside of arm 637 and provide slidable support for guide rods 646, which are fixed to basket 645 by end supports 648. Gear rack 650 is secured to basket 645 by support 650*a* and engages gear 639. Basket 645 is provided with horizontal supports 651 and 652 and vertical supports 656. Straps 657 and 658 are adapted to receive carcass halves 50*a* and 50*b* from horizontal moving frame 562 and transfer them to mechanism No. 4, generally 508.

Referring to FIGS. 21 and 22, mechanism No. 4, generally 508, will be explained in detail. Mechanism 508 is adapted to move carcass 50 in three directions, that is, horizontally, vertically and transversely. Mechanism 508 includes stationary frame 660, horizontally moving frame 661, vertically moving frame 662, horizontal drive means 663, and vertical drive means 664.

Stationary frame 660 includes legs 665, longitudinal supports 666 and transverse supports (not shown). Tracks 679 (illustrated by dashed line in FIG. 21) are mounted on frame 660.

Horizontal drive means 663 is mounted on frame 660 by support 668 and includes motor 669, angle gear drive 670, and gear 671, which is secured to shaft 672 of gear drive 670.

Horizontally moving frame 661 includes longitudinal supports 673 and transverse supports 673*a*. Mounted on frame 661 are guide bearings 674, pillow blocks 676, and vertical drive means 664. On the underside of support 661 are bearings 677 which are adapted to rotatably support rollers 678. Rollers 678 ride on tracks 679 of frame 660. Also mounted on the underside of frame 661 is gear rack 680, which is adapted to mesh with gear 671 of drive means 663.

Motor 683 of drive means 664 has shafts 682 coupled to drive shafts 684 by couplings 685. Shafts 684 are rotatably mounted in pillow blocks 676, the ends of shafts 684 having mounted thereon gears (not shown).

Vertically moving frame 662 has an arm support 690 and attached to the underside of support 690 are guide rod supports 691, which are fixedly secured to guide rods 692. Guide rods 692 are adapted to slide within bearings 674. Also mounted on the underside of support 690 are gear rack supports 693 which support gear racks 694, which engage gears on shafts 684, so that rotation of shaft 684 will impart vertical motion to gear racks 694 and ultimately, to support 690. Secured to support 690 are arm assemblies 695, 696 and 697. Assemblies 695 and 696, as shown best in FIG. 20 and FIG. 22 are slideably mounted in brackets 698, which are secured to support 690. Arms 699 and 700 are connected by cross support 701. Cam follower 702 is secured to the underside of cross support 701 of transfer arms 695 and is adapted to be guided by cam 703, which is secured to loin pulling table, generally designated as 704, as shown in FIG. 16. Cam 702 enters the area between guide plates 705 and 706 of cam 703 so as to be guided into proper alignment with loin pulling table 704. Regarding arm assembly 696, cam follower 707 is provided on the upper side of cross support 701. Cam follower is adapted to be guided into the area between guide plates 710 and 711 of cam 712 as shown in FIG. 16.

In order to illustrate the value of a conveyor system as has been described, it would be advantageous to have a detailed description of the important loin pulling operation. Such a description follows, to be followed by an explanation of the operating relationship between the conveyor system and the loin pulling operation.

*Loin Pulling Mechanism*

As has been explained in our copending application Serial No. 77,121, filed December 20, 1960, the sighting mechanism A is employed for preselecting the points or lines of division of the carcass so that at later stages in the operation the individual carcass can be divided in accordance with the selection made at the first station—the control setup.

Referring to FIG. 3, hog carcasses 50 are carried by over-head trolleys 51 along rail 52. As carcasses 50 and trolley 51 contact the automatic hog dropping mechanism 53, carcasses 50 are automatically released from trolley 51 and drop on chute 54. The hog halves are positioned skin side down on table 55 and table 56, the ham end 57 rests on table 55 and the shoulder end 58 rests on table 56. For purpose of explaining the loin-pulling mechanism, particularly refer to scribe line 61 and saddle line 62 which represent light beams emitted by loin lamp 63.

Since there has already been a detailed description of loin lamp 63 in our copending application Serial No. 77,121, there will be only a brief description of this lamp assembly. Referring to FIGS. 26 through 29, when hand grip 124 is rotated, this rotates shaft 120 and gear 125 which is secured to shaft 120. Gear 125 meshes with gear rack 135 and causes loin lamp 63 to move since both lamp 63 and rack 135 are secured to plate 88. Gear rack 138 is secured to extension arm 137 which is fixed to plate 88, so rack 138 will also move when hand grip 124 is rotated. This particular movement of loin lamp 63 positions scribe line 61 on carcass 50. The position of scribe line 61 is electrically recorded by rotary switch 141, since gear rack 138 meshes with gear 139 on shaft 140 of rotary switch 141.

Also required in the loin pulling operation is the proper positioning of the saddle line 62 on the carcass 50. Saddle line 62 is positioned by pushing or pulling hand grip 124, which causes frame 75 to roll on tracks 72 and 73 of frame 70. Movement of frame 75 causes the movement of loin lamp 63, and thereby the proper positioning of saddle line 62. While saddle line 62 is being positioned, gear rack 128 which is secured to frame 75 by bracket 127, causes rotation of shaft 130 of rotary switch 131 by meshing with gear 129. This movement of shaft 130 causes switch 131 to electrically record the position of saddle line 62 on carcass 50.

Since the control mechanism C was explained in detail in our copending application Serial No. 77,121, this mechanism will be described only briefly. Mechanism C sets into operation means for moving the dividing elements relative to the carcass 50 so that the loin pulling for a particular carcass is carried out in exact response to the preselection by sighting means A at Station No. 1. The control mechanism is illustrated in general in FIG. 25.

Two of these control units are used in our pork breakup system, one unit being used to bring the dividing elements into proper relative alignment with the hog carcass depending upon the length of the animal, as determined by the position of saddle line 62; and a second unit being used for moving the loin pulling table which causes the hog carcass 50 to be positioned properly for the loin pulling operation, as determined by the position of scribe line 61. Since the operation of both control mechanisms are substantially the same, only the unit for adjusting the dividing elements for the length of the animal will be described.

Referring to FIG. 25, linear motor 406 contains 27 solenoid coils, each coil being connected electrically to one of 27 normally open contacts in rotary switch 131. A second control mechanism has the 27 solenoid coils of linear motor 406 connected electrically to one of the 27 normally open contacts in rotary switch 131. Depending upon which contact in rotary switch 131 is closed, one of the solenoid coils in linear motor 406 will be energized. Shaft 407 moves out to a given point as determined by the solenoid coil which has been energized in linear motor 406. Memory pin actuator 408 being secured to shaft 407 pushes memory pin 444*a* out a distance which corresponds to the position of the energized coil in motor 406. Shaft 407 is returned to the starting position and memory pin 444*a* is indexed four times until it reaches the position formerly occupied by memory pin 444*e*. Mounted on sliding table 476 are cables 271 and 301, and also limit switch 483. Table 476 moves toward pin 444*a* until actuator 484 of switch 483 contacts pin 444*a*. This contact causes motor 459 to stop causing table 476 to stop. Movement of cables 271 and 301 positions loin knife cam plate 263 and scribe saw cam plate 295. The second control unit for adjusting table 704 according to the position of scribe line 61 has cable 726 mounted on table 476, and this cable positions loin pulling table 704.

The loin pulling mechanism B is illustrated best in FIGS. 4 through 15.

The loin-pulling mechanism B includes stationary frame 160 which is mounted on overhead structure 161 (partially shown in FIG. 4) and moving frame, generally designated as 162. Stationary frame 160 and moving frame 162 are connected by two tie rods 163 and four cross bars 164.

Referring to FIGS. 5 and 6, motor 165 is mounted on stationary frame 160 on base 166. Motor shaft 167 is connected to shaft 168 of reducer 169 by means of coupling 170 and reducer 169 is permanently fixed to stationary frame 160 on base 171. Shaft 172 of reducer 169 is positioned at approximately right angles to shaft 168. One end of shaft 172 is fixed to coupling 173 to which is permanently fixed pinion 174, and the other end is permanently fixed to pinion 175.

Bracket 176, permanently fixed to stationary frame 160 by bolts 177, is attached to support 178 by bolts 179, support 178 providing a mounting for feed-back Selsyn unit 180. Shaft 181 of Selsyn unit 180 is attached to gear 182, which meshes with pinion 174 of coupling 173. Selsyn 180 is a part of a conventional Selsyn system, which is used for the vertical positioning of the loin-pulling apparatus mounted on frame 162.

Meshing with pinion 175 on shaft 172 of reducer 169 is gear 183 which is permanently fastened to drive shaft 184. Shaft 184 is rotatably supported in pillow blocks 185, 186 and 187 which are fixed to cross members 188, 189 and 190, respectively, of frame 160. Shaft 184 also passes through magnetic brake unit 191, which is permanently connected to bracket 192, and the latter in turn is attached to stationary frame 160 by bolts 193.

Attached to end members 200 and 201 of stationary frame 160 are vertical guide tracks 202 and 203 which are formed by plates 204 and by bars 205.

Mounted on both ends of shaft 184 are crank arms 206 and 207. Fastened to crank arm 206 is limit switch actuator 208. The periphery 209 of limit switch actuator 208 is positioned to contact roller actuator 210 of limit switch 211, roller actuator 212 of limit switch 213 and also roller actuator 214 of limit switch 215. Limit switch 211 is mounted on bracket 216 which is mounted on frame 160 by bolts 217; limit switch 213 is mounted on bracket 218 which in turn is secured to frame 160 by bolts 219; and limit switch 215 is mounted on bracket 220 which is fastened on frame 160 by bolts 221.

Cross bars 164 provide vertical support for frame 162 by attachment to stationary frame 160. End portions 230 of cross bars 164 are hingeably mounted on frame 160 and on frame 162 by rods 231 passing through cross bars 164 and through hinge support mounting 232, which is attached to frame 160, and hinge support mounting 233, which is attached to frame 162. End portions 234 of cross bars 164 are hingeably mounted on sliding hinge supports 235 and 236. Support 235 is free to move along guide rod 238 mounted on guide rod supports 239 which are permanently fastened to stationary frame 160. Sliding hinge support 236 is free to move along guide rod 240 which is held in a fixed position by means of guide rod supports 241 attached to frame 162. Cross bars 164 are hingeably connected, in pairs, at their center portions 242 by means of bolts 243 and nuts 244. Cross bars 164 provide vertical support for frame 162 and are hingeably mounted to sliding hinge supports 235 and 236 so as to allow frame 162 to raise and lower.

Tie rods 163 are hingeably attached to crank arms 206 and 207, by rods 250 and 251 passing through rod end bearings 252 and 253, and into crank arms 206 and 207, rod end bearings 252 and 253 being permanently fastened to tie rods 163. Tie rods 163, at their opposite ends, are fastened to rod end bearings 254 and 255. Rod end bearings 254 and 255 are hingeably attached to frame 162 by hinge supports 256 and 257 and by bolts 258 and nuts 259. Tie rods 163, being hingeably connected to crank arms 206 and 207, which in turn are connected to shaft 184, cause the vertical motion of frame 162.

Referring to FIGS. 4, 5 and 10 through 15, stationary loin knife cam plate 260 is mounted on frame 162 by cam plate supports 261 and 262. Moving loin knife cam plate 263 is slidably mounted on guide bars 264 and 265, cam plate 263 being secured to moving cam plate supports 266 and 267 which are designed to slide on guide bars 265 and 264. The ends of guide bars 264 and 265 are secured to cam support 262 and bracket 268. Cable support 269 is secured to cam plate 263 by means of bolts 270 and cable 271 is secured to cable support 269 by nuts 272. Moving cam plate 263 is provided with three extensions 274 which are provided with slots 275 for receiving pins 276 on cam plate 260. On movement of cable 271, cam plate 263 moves forward or backward on guide bars 264 and 265 to an extent determined by the length of slots 275 of extensions 274. Cam plates 260 and 263 together provide cam track 277 for forward motion, and cam track 278 for reverse motion. Cam tracks 279 are slanted as illustrated in FIG. 15 to allow downward movement of cam followers. Similarly, cam tracks 280 are slanted opposite to cam tracks 279 so as to permit upward movement of the cam followers. It should be noted that cam plate 263 is provided with high point 281 on cam track 277 corresponding to the position indicated by the saddle line 62 in Station 1, Control Set-Up.

Stationary scribe saw cam plate 290 is mounted on frame 162 by support bracket 291; stationary scribe saw cam plate 292 is mounted on support bracket 293 which is secured to frame 162 by bolts 294 as shown in FIG. 9. Moving scribe saw cam plate 295 is mounted on cam plate supports 296 and 297, which are provided with bearings 298 so as to allow a sliding movement of cam plate 295 on guide rods 299 and 300, shown in FIG. 9, and which are secured at their extremities upon cam plate support brackets 291 and 293. Cable 301 is fastened to bracket 302 on cam plate 295 by nuts 303. Cam plate 295 is provided with extensions 304 having slots 305 which receive pins 306 on cam plate 290. Cam plate 295 also has extensions 307 having slots 308 for receiving pins 309 on cam plate 292. Cam plate 295 is free to move backward and forward upon guide rods 299 and 300, the extent of travel being limited by the length of slots 305 and 308. Cam plate 295 is provided with cam 310, slanted upward so as to carry cam roller 311 into cam track 312. Cam roller 311 rides in cam track 312 for a part of the forward stroke and for its entire reverse stroke until it drops upon contacting cam 313. Track 312 is formed in all three cam plates 290, 292 and 295. The movement of cam plate 295 corresponds to the amount of movement of loin knife cam plate 263, so it can be seen that the position of cam plate 295 is determined by the position of saddle line 62 in Station 1.

Mounted on frame 162 by bolts 320 are end supports 321 and 322, as illustrated in FIG. 7. Attached to end supports 321 and 322 are guide rods 323 and 324 which are secured at their end positions to end supports 321 and 322 by flanges 325 and screws 326. Spacers 327 are secured to guide rods 323 and 324 by screws 328. Mounted parallel to and between guide rods 323 and 324 is ball screw 329 which is rotatably mounted in bearing 330 on flange 331 of end support 321, and in bearing 332 in flange 333 of end support 322.

Mounted at the forward end of ball screw 329 is sprocket 334. Motor mounting 335 is secured to frame 162 and provides support for motor 336. Mounted on shaft 337 of motor 336 is sprocket 338; chain 339 meshes with sprockets 334 and 338 so as to transmit rotation of shaft 337 to ball screw 329.

Threadably engaging ball screw 329 and riding on guide rods 323 and 324 is the loin pulling carriage assembly, generally designated 340, central portion 341 threadably engaging ball screw 329. Mounted on central portion 341 are spacer 342, which is secured to guide rod runner 343, and spacer 344, which is fastened to guide rod runner 345. As partially shown in FIG. 7, guide rod runners 343 and 345 utilize ball bearings 346 to provide smooth movement of carriage assembly 340 along guide rods 323 and 324.

Scribe saw carriage, generally designated 347, is mounted on spacer 342 by side support 348, scribe saw carriage 347 being best illustrated in FIG. 8. Side support 348 is connected to side support 349 in the upper position by cross support 350 and bolts 351, and in the lower position by cross support 352 and bolts 353. Tracks 354 and 355 of scribe carriage 347 are formed by guide bars 356 and they provide guides for rollers 357 and 358 of vertical carriage 359. Sides 360 of vertical carriage 359 are held in spaced relationship by center support 361, which also provides support for roller 311. Secured to the lower end of vertical carriage 359 is scribe saw motor 362, to which is mounted scribe saw 363. Roller 311 is designed to ride on cam 310 and in cam track 312 of cam plates 290, 292 and 295.

Referring to FIG. 9, bearing 370 is provided in spacer 342 and bearing 371 is provided in spacer 344 to allow sliding movement of loin knife guide bars 372 and 373, which are provided with stops 374 and 375. Guide bars 372 and 373 are fastened to pivot bar 376 by screws 377, pivot bar 376 being pivotably mounted to loin knife support 378. Loin knife support 378 has two end supports 379 and 380 which are fastened together by tie bars as 381. Mounted on end support 379 of loin knife support 378 are cam rollers 383 and 384 and loin pulling knife 385 is fixed to loin knife support 378 by brackets 386 and 387. Cam rollers 383 and 384 are designed to ride in cam tracks 277 and 278 of loin knife cam plates 260 and 263. Also, rollers 383 and 384 are adapted to rotate knife support 378 about pivot point 388.

Referring to FIGS. 7 and 9, mounted on spacer 342 is extension arm 390, having limit switch actuator 391 which is designed to contact roller 392 of limit switch 393 which is secured to frame 162 by bolts 394. When limit switch 393 is contacted, the carriage 340 has reached the end of its forward stroke and it will stop motor 336.

Referring to FIG. 16, there is an illustration of loin pulling table 704. Table 704 is slideably secured to stationary support 727 (shown by dashed lines) by guide rod supports 728 which are secured to support 727, brackets 728 being fastened to guide rods 729. Bearings 730 are secured to the under side of loin pulling table 704 as by welding and are slideably positioned on guide rods 729. Also secured to stationary support 727 by screws 732 is electromagnet mounting 731 to which is attached electromagnet 731*a*. Also, spring 733 has one end 734 attached to mounting 731. The other end 735 of spring 733 is fastened to bracket 736, which is secured to the underside of loin pulling table 704 by screws 737. Loin pulling table 704 is provided with slots 738 and 739 which are adapted to receive arms 699 and 700 of arm assemblies 695 and 696, so that the hog carcass 50 may be set down and picked up from loin pulling table 704. Ham end supports, generally 740 and 741, are secured to table 704 by flanges 742 and 743. Strap supports 744 and 745 are secured to ham end straps 746 and 747, which are secured at their other ends 748 and 749 to loin pulling table 704 as by welding. Mounted intermediate ham end supports 740 and 741 is suction cup 750 which is secured to table 704 by bracket 751. Suction cup 750 is connected to a vacuum source (not shown). Also secured to loin pulling table 704 are shoulder end supports 752 and 753 which are connected to loin pulling table 725 by flanges 754 and 755 as by welding. Strap supports 756 and 757 are secured to shoulder straps 758 and 759, which have their other ends fixed to table 704, as by welding. Mounted intermediate shoulder end supports 752 and 753 are suction cups 760 and 761 which are secured to table 704 by bracket 762. Suction cups 760 and 761 are connected to a vacuum source (not shown). As previously described, attached to the front end 770 of loin pulling table 725 are cams 703 and 712. Cam 703 is attached to the upper-side of table 704 as at 771 by arm 772 which has secured to its upperside guide plates 705 and 706 which are substantially normal to base 773. Also attached to the front end 770 of loin pulling table 704 is cam 712 which is attached to the underside of loin pulling table 725 by bracket 744. Plates 710 and 711 are attached substantially normal to the underside of base 775 and are adapted to receive cam follower 707 which is mounted to the upperside of arm assembly 696. Loin pulling table 704 is provided with aperture 776. Secured to the underside of table 704 is bracket 777 which secures limit switch 778, limit switch 778 having roller actuator 779. Also attached to the underside of loin pulling table 704 is bracket 780 which has attached to it cam 781 for contacting actuator 779 of limit switch 778. Cam 781 has attached to it arm 782 which protrudes through aperture 776 and is maintained in this position by spring 783. When carcass 50 is set down on straps 746, 747, 759 and 758, the carcass 50 will force arm 782 down, which causes microswitch 778 to be actuated.

Referring to FIGS. 19, 21, 32 and 33, there is an illustration of a photoelectric sensing unit 790 for determining the location of the fat-lean line of the loin portion. Photoelectric unit 790 sends out a light beam from cell 793, the beam striking the lean portion of a carcass 50 at the shoulder and is then reflected back to cell 794 of unit 790. Unit 790 is mounted on plate 795 which is secured to rod 796. Rod 796 is in turn slideably positioned in guide 797 and may be locked in position by bolt 798. Guide 797 is secured to leg 799, leg 799 being connected to support 800 by sleeve 801. Leg 799 is slideably adjustable in sleeve 801 and is held in a fixed position by bolt 802.

Referring to FIGS. 30 and 31, there is an illustration of a Selsyn unit which is used in conjunction with the above described photoelectric unit 790. Selsyn unit 805 is held in a fixed position by upper mounting 806 and lower mounting 807 which are fastened together by bolts 808. Lower mounting 807 is secured to base 809 by screws 810. Shaft 811 of Selsyn unit 805 is securely fastened to shaft 812, the opposite end of shaft 812 being rotatably mounted in end support 813 by bearing 814. Brake support plate 815 is secured to base 809 by screws 816, brake 817 being mounted to plate 815 by screws 818. It should be noted that brake 817 is electrically connected with photoelectric unit 890, and is actuated when photoelectric unit 790 senses the fat-lean line, and brake 817 locks shaft 812. Plate 819 is secured to shaft 812 and is provided with stop pin 820. Plate 819 is also provided with recess 821 for contacting zero position stop pin 822 which is threadably mounted in support 823, the position of pin 822 being fixed by nut 824. Plate 825 is provided and is connected to torque limiter 826 so plate 825 will continue to rotate even after shaft 812 is locked in a fixed position by brake 817. Plate 825 is provided with spring mounting pin 827 and roller cam 828, which is adapted to contact cam actuator 829 on transfer mechanism 508 at the time transfer arms 699 and 700 raise carcass 50 out of basket 645. Projection 830 of cam actuator 829 remains in contact with cam roller 828 as transfer assembly 508 continues to rise. Selsyn unit 805 may be supported in any suitable means relative to transfer mechanism 508 so that cam roller 828 contacts cam actuator 829 while transfer mechanism 508 continues to rise. When mechanism 508 has reached its full up position and begins its horizontal movement, spring 836 retracts arm 835 of plate 825. Spring 829*a* is also fastened to stationary arm 830*a* by pin 831. Stationary arm 830*a* is secured to base 809 by screws 833.

Now that the conveyor system and loin pulling operation have been described in detail, the operation of these mechanisms will be described, setting out the inter-relationship between each of the mechanisms.

*Operation*

For an overall picture of the entire pork break-up machine, we refer to FIGS. 1 and 2. At the Control Set-Up Station, the halves of the hog carcasses 50 are positioned for cutting. At approximately the same time that the hog carcass is being positioned at the Control Set-Up (Station 1), the halves of another hog carcass are having the hams and hind feet cut off at the Ham and Foot Cut-Off (Station 2) and the halves of still another hog carcass are at the Shoulder Cut-Off (Station 3). A fourth hog carcass is having its right half turned approximately 98° and its left half turned approximately 82°, the left and right loins of another hog carcass are being pulled at the Loin-Pulling Station (Station 4). The belly and back of both halves of a sixth hog carcass are being rolled simultaneously at the Belly and Back Roll Station (Station 5). Simultaneously, the ribs of both left and right halves of another hog carcass are being pulled at the Rib Pulling Station (Station 6). Finally, the bellies and backs of both halves of an eighth hog carcass are being split at the Belly and Back Split Station (Station 7).

The ham and foot cut off mechanism is explained in detail in our copending application Serial No. 122,321, the shoulder cut off mechanism is described in detail in our copending application Serial No. 128,733, the belly and back roll mechanism and the rib pulling mechanism are explained in our copending application Serial No. 181,939, and the belly and back split mechanism is explained in detail in our copending patent application Serial No. 203,931.

Referring to FIG. 2, hog carcasses 50 are first moved transversely to the direction of their travel, until both halves are rotated, after which they are moved longitudinally to the direction of their travel. The ham and foot cut off, the shoulder cut off, the loin pulling, the belly and back roll, the rib pulling, and belly-back split operations are carried on in sequence for each carcass half.

Referring to FIG. 3, hog carcasses 50 are carried along rail 52 on trolleys 51. As trolley 51 strikes the automatic hog dropping mechanism 53, hog carcass 50 is released, drops on chute 54 and operators, one standing at the ham end 57 and another standing at the shoulder end 58, position both halves of carcass 50 on tables 55 and 56. The operator standing on the shoulder end 58 positions carcass 50 with respect to the shoulder line 59 emitted by the shoulder line 60. When the halves have been positioned with respect to the shoulder line 59, one of the operators presses a button which actuates transfer mechanism 501, lifting both halves of carcass 50 off tables 55 and 56 into the transfer position.

When the operator presses the lifting button, motor 522 is started and rotates ball screw 528 through gear unit 525. Ball nut 531, which threadably engages ball screw 528, moves upward as ball screw 528 rotates. Since ball nut 531 is secured to moving frame 514, the entire frame 514 moves upward until it reaches the full up position, at which time motor 522 stops upon the actuation of a limit switch (not shown). On its upward movement, shoulder end straps 547 and ham end straps 548 contact each half of carcass 50, raising them to the preselected full up position.

When the carcass halves are in the up position, the operator at the shoulder end 58 positions loin lamp 63 so that scribe line 61 is positioned at the desired location of the scribe cut and saddle line 62 is positioned at the saddle of the animal. Scribe line 61 indicates the position, at which the scribe saw will separate the spare ribs from the loin ribs. Saddle line 62 crosses the position at which the back of the hog is lowest while the animal is in a standing position. The exact position of the saddle line 62 on a given animal varies according to the length of the animal. While the operator on the shoulder end 58 is positioning loin lamp 63, the operator on the ham end 57 is positioning ham lamp 66 and foot lamp 68 at the position indicated by ham lines 64 and 65 and foot line 67 for the ham and foot cuts. By positioning these six light lines, the hog carcass 50 will be divided into the major pork cuts, including shoulders, bellies, backs, ribs, loins, hams and hind feet.

As there has already been a detailed description of the operation of loin lamp 63 in our copending application Serial No. 77,121, the operation of loin lamp 63 will be described only briefly.

Refer to FIGS. 26 and 27 for the description of loin lamp 63. The operator on the shoulder end 58 grasps hand grip 124 for positioning beams 61 and 62 on carcass 50. When the operator pulls or pushes grip 124, loin lamp 63 is moved transverse to the break-up machine and saddle line 62 is being positioned. By selecting the desired position for saddle line 62 on the carcass 50, the operator closes one of 27 normally open contacts in rotary switch 131. The particular contact that is closed corresponds electrically to the position of saddle line 62 on hog carcass 50. The same operator also positions scribe line 61 and this is accomplished by rotating hand grip 124. This causes movement of loin lamp 63 in a direction longitudinal to the break-up machine, movement being at approximately right angles to the positioning of saddle line 62. By so positioning scribe line 61 on carcass 50, one of 27 normally open contacts in rotary switch 141 is closed. The particular contact that is closed corresponds electrically to the position of scribe line 61 on hog carcass 50. While the loin lines are being positioned by the operator on the shoulder end 57, the operator on ham end 58 positions lines 64 and 65 for the ham cut and also positions line 67 for the hind foot cut off.

As there is a detailed explanation of the control mechanism C in our copending application Serial No. 77,121, this control mechanism will be described only briefly.

As previously mentioned, two control mechanisms are used, one being used for adjusting the saddle position of a carcass 50, the other control mechanism C being used to adjust for the scribe cut. Referring to FIG. 25, linear motor 406 contains 27 solenoid coils each of which are connected electrically to one of the 27 normally open contacts in rotary switch 131. Depending on which contact in the rotary switch 131 is closed, one of the solenoid coil circuits in linear motor 406 will be set-up. This solenoid is energized after the operator in the control set up Station 503 has pressed the set-up button and after a 10.9 second cycle timer (not shown) has energized the starting circuit. Shaft 407 of linear motor 406 moves out a distance as determined by the position of the energized coil in linear motor 406. Memory pin actuator 408 pushes memory pin 444*a* outward from memory wheel 442 a distance corresponding to the distance travelled by shaft 407. In the second control mechanism C, rotary switch 141 causes one of 27 solenoid coils to be energized in linear motor 406, ultimately causing the outward movement of another memory pin 444*a*. After the memory pin 444*a* has been positioned, shaft 407 is returned to the starting position, where shaft 407 actuates switch 414. With switch 414 closed and with sliding table 476 in the starting position, memory wheel 442 is indexed into the second position by a Geneva mechanism. While pin 444*a* is being indexed, the hog carcass 50 to which pin 444*a* corresponds is being transferred from Station 1, the control set-up 503, to Station 2, the ham and foot cut off 504. The operation of transfer mechanism 502 will now be described.

With the carcasses 50 in the full up position on mechanism 501, with the 10.9 second cycle timer energized, and after the operator has pressed the set up button, transfer mechanism 502 is actuated. Referring to FIGS. 17 through 20, when all appropriate circuits are closed, vertical drive motor 580 starts and rotates shafts 583, causing rotation of ball screws 587 through gear drive 585. Since ball nuts 589 threadably engage ball screws 587, they are driven upward upon rotation of ball screws 587. Ball nuts 589 are secured to vertical moving frame 561 and thereby drive this frame upward. On its upward movement, mechanism 502 lifts hog carcass 50 out of shoulder straps 547 and ham straps 548 of mechanism 501 by shoulder straps 576 and ham straps 577 of transfer mechanism 502. Hog carcasses 50 are simultaneously being lifted out of ham cut-off station 504 and should cut-off station 505. When frame 561 has reached the appropriate up position, which is determined by a limit switch (not shown), motor 580 stops and horizontal drive motor 604 is started. Also, at this time, motor 522 is reversed and drives transfer mechanism 501 downward to the starting position so that the control set-up station 503 is ready to receive another hog carcass 50.

Horizontal drive motor 604, through gear drive 605 causes rotation of gear 606 which meshes with gear rack 628 on horizontal moving frame 562. Hog carcasses 50 are then carried horizontally approximately 80 inches by frame 562, which rides on tracks 599 of frame 561 by means of rollers 625. In its horizontal motion, a limit switch (not shown) is contacted, cutting in a Selsyn unit (not shown) which positions frame 562 in proper alignment for depositing hog carcasses in three stations—the ham cut off station 504, the shoulder cut off station 505, and the left and right half turn mechanism 506 and 507.

When horizontal moving frame 562 is in position, Selsyn unit stops motor 604 and actuates the reverse circuit of vertical drive motor 580, thereby rotating ball screws 587 which lower vertical lift frame 561. On lowering, hog carcasses 50 are deposited in the ham cut off 504, in the shoulder cut off 505, and in the turn mechanisms 506 and 507. When vertical drive mechanism 561 reaches its full lowered position, a limit switch (not shown) is actuated, stopping motor 580 and starting the reverse circuit of motor 604 which drives frame 562 back to the starting position. Another Selsyn unit (not shown) positions the horizontal drive frame 562, by stopping motor 604. Transfer mechanism 502 is now in position for the start of the next cycle. A complete cycle of mechanism 502 includes lifting hog carcasses 50 out of their respective stations, carrying the carcasses horizontally to subsequent stations, dropping carcasses 50 at the respective stations, and returning the mechanism 502 to its starting position for repeating another cycle.

The carcass which has been set up in Station 1 has its hams and hind feet removed at ham and foot cut-off Station 504; mechanism 502, going through another cycle, picks up the carcass from the ham cut-off station and transfers it to the shoulder cut off station 505. At the same time, memory pin 444*a* is indexed again into the third position which corresponds to the hog carcass in the shoulder cut off station. Upon having both shoulders cut off, the carcass 50 is transferred to turn mechanisms 506 and 507. Also, memory pin 444*a* is indexed to a fourth position, which corresponds to the hog carcass in the turn stations.

Referring to FIGS. 19 and 20, turn mechanisms 506 and 507 retract the left and right halves 50*a* and 50*b* of hog carcasses 50 towards the respective left and right half branches 629*a* and 629*b* of the machine, and also rotate each half approximately 90° so that the shoulder end 58 of each half is in the leading position. As the operation of mechanisms 506 and 507 are substantially the same, except for minor mechanical differences necessary for positioning each half, only left half turn mechanism 507 will be described in detail. When left half 50*a* of hog carcass 50 is set down in straps 657 and 658 of turn-around basket 645, a switch (not shown) starts motor 638 which rotates gear 639. Gear 639 meshes with gear rack 650 on basket 645, retracting basket 645 towards left branch 629*a* by means of guide rods 646 sliding in supports 642 on the underside of arm 637. When left half 502 reaches the appropriate retracted position, a limit switch (not shown) stops motor 638 and starts motor 632.

Motor 632 rotates gear 635 which meshes with large gear 643. Gear 643, being secured to arm 637 and also being rotatably mounted with respect to support 636, rotates arm 637 as well as basket 645. The rotation transfers the shoulder end 58 of hog carcass half 50*a* into the leading position. The halves are brought into longitudinal alignment with the loin cutting members so that scribe line 61 is substantially parallel with the direction of the scribe cut. For this reason, left half 50*a* is rotated approximately 82° and right half 50*b* is rotated approximately 98°. When basket 645 has turned the desired amount, a switch (not shown) is actuated, stopping motor 632.

After transfer mechanism 508 has lifted the carcass halves 50*a* and 50*b* from turn mechanisms 506 and 507, the reverse circuit of motor 632 is actuated and basket 645 which carried left half 50*a* is rotated back 82°, and basket 645 which carried right half 50*b* is rotated back 98°, until a switch (not shown) is actuated, stopping motor 632 and starting the reverse circuit of motor 638. Motor 638 continues to operate until basket 645 of both turn mechanisms is returned to the starting position, at which time another limit switch (not shown) stops motor 638. While halves 50*a* and 50*b* are being transferred from mechanisms 506 and 507 to mechanism 508, memory pin 444*a* is indexed again until it reaches the position occupied by pin 444*e* in FIG. 25, which corresponds to the carcass 50 in the loin pulling station 509.

Since only the right branch of the break-up machine is illustrated, the description of the operation of transfer mechanism 508 and the loin pulling station 509 will be directed to operations on the right branch 629*b*, with the understanding that the same operations are taking place on the left half 629*a* of the machine.

Referring to FIGS. 19 through 22, the limit switch, which indicates that the carcass right half 50*b* has been turned 98°, also stops the rotation of basket 645, starts motor 683 and energizes the circuit for emitting the light beam from cell 793 of photoelectric unit 790. The beam is positioned to strike the red lean portion at the cut shoulder end 58 of the carcass 50. The beam is then reflected back to cell 794 of photoelectric unit 790. Motor 683 rotates shafts 684, to which are mounted gears (not shown), which mesh with gear racks 694 on vertical frame 662. This imparts vertical motion to frame 662, the vertical movement being guided by guide rods 692 sliding in bearings 674. When the contour of arms 699 and 700 of arm assembly 695 matches the contour of straps 657 and 658 of basket 645, cam actuator 829 of transfer mechanism 508 contacts cam roller 828 on plate 825, which is pivoted about shafts 812 and 811 of Selsyn unit 805. As transfer mechanism 508 continues to rise, lifting carcass 50 out of basket 645, shaft 811 of Selsyn unit 805, shaft 812, plate 819 and plate 825 are pivoted, causing Selsyn unit 805 to be pivoted from the zero position. As the carcass 50 is being lifted by mechanism 508, the light beam from photoelectric unit 790 strikes the hog carcass 50 at the shoulder. When the beam crosses from the red of the lean into the white of the fat, brake 817 is energized, locking shaft 812, plate 819 and Selsyn unit 805 at that angle of rotation. Cam roller 828 continues contacting cam actuator 829 and continues to pivot by slipping within torque limiter 826. When frame 662 reaches its full up position, a limit switch (not shown) is actuated and stops motor 683, opens the circuit from photoelectric unit 790, energizes horizontal drive motor 669, and, as previously mentioned, actuates the reverse circuit of motor 632 for driving basket 645 of turn mechanism 506 back 98°.

Horizontal drive motor 669, through angle gear drive 670 rotates gear 671. Since gear 671 meshes with gear rack 680 on horizontal drive frame 661, frame 661 is moved in a horizontal direction. Frame 661 rides on tracks 679 by means of rollers 678. Horizontal movement of frame 661 also causes the horizontal movement of vertical frame 662 and thereby the movement of arm assemblies 695, 696 and 697. As frames 661 and 662 move forward, cam actuator 829 releases cam roller 828 on plate 825, which is returned to the position at which the Selsyn unit 805 is locked. Plate 825 is held in this position by arm 835 contacting pin 820 on plate 819. Plate 825 is returned to this position by action of spring 829*a*. On the horizontal movement of transfer mechanism 508 hog carcasses 50 are transferred from turnaround mechanisms 506 and 507 to loin pulling station 509, from loin pulling station 509 to the belly and back roll 510, from the belly and back roll 510 to rib pulling 511. As frames 661 and 662 move forward, a limit switch (not shown) is contacted, cutting in a Selsyn unit (not shown) which horizontally positions frame 661 for setting down hog carcasses 50 at the proper stations. When the frame is in position, the Selsyn unit stops motor 669 and energizes the reverse circuit of motor 683 in order to lower frame 662, which carries carcasses 50.

Frame 662 continues downward until a limit switch (not shown) is contacted, stopping motor 683 and starting the reverse circuit of motor 669 for driving frame 662 and frame 661 back to the starting position. In the reverse movement, frame 662 trips a limit switch (not shown) which cuts in a Selsyn unit for positioning frames 661 and 662 for picking up hog carcasses 50 from transfer mechanisms 506 and 507, from loin pulling station 509, and from belly and back roll station 510. When frame 662 is in position, the Selsyn unit stops motor 669. It can be seen from the above that a cycle of mechanism 508 includes lifting, horizontal transfer, dropping and reversing to the starting position. The cycle is similar to the movements performed by transfer mechanism 502 except mechanism 508 also carries carcasses 50 transverse to the machine.

As the loin pulling operation is closely related to the conveyor mechanism there will be a detailed description of the operation of the loin pulling mechanism by referring to FIGS. 4 through 16. Briefly, in order to bring a hog carcass into proper alignment with the loin cutting elements, at least three movements are required. One movement is for the proper vertical positioning of loin knife 385 and scribe saw 363. The second movement required is a transverse positioning of the carcass 50 for making the scribe cut with saw 363 at the position indicated by scribe line 61 in Station 1. The scribe cut separates the spare ribs from the loin ribs of the hog carcass and allows knife 385 to cut freely without interference from unsevered bones. For the latter purpose one leg of U-shaped knife 385 is in alignment with the blade of scribe saw 363. The third movement required is length adjustment which is determined by the location of saddle line 62 in Station 1.

For a description of the length adjustment, refer to FIGS. 10 through 15. Cable 271 is secured to cable bracket 269 which is fastened to loin knife cam plate 263, and cable 301 is secured to bracket 302 on scribe saw cam plate 295. The opposite ends of cables 271 and 301 are secured to support 496 of sliding plate 476 as illustrated in FIG. 25. As sliding plate 476 is moved towards memory pin 444*a* in the position illustrated as occupied by memory pin 444*e* in FIG. 25, cables 271 and 301 are being moved and are positioning loin knife cam plate 263 and scribe saw cam plate 295. When roller actuator 484 of limit switch 483 contacts memory pin 444*a*, motor 459 stops, stopping sliding plate 476 and locking loin knife cam plate 263 and scribe saw cam plate 295 in proper position for the particular length of animal to be cut.

A second control mechanism C is used to align the scribe cut with the scribe line 61 and operates in substantially the same manner as for positioning cam plates 263 and 295. Cable 726 has one end attached to cable support 496 on moving table 476, the other end being attached to loin pulling table 704 by bracket 836 and nut 837. Motor 459 in the second control mechanism C also starts to operate when the limit switch indicates that transfer mechanism 508 has reached the full up position. As hog carcass 50 is being carried to the loin pulling table 704 on transfer mechanism 508, table 704 is being positioned by cable 726 since bearings 730 slide on rods 729. When memory pin 444*a* energizes limit switch 483, motor 459 stops and electromagnet 731*a* is energized, locking loin pulling table 704 in a fixed position. Then, as carcass 50 on arm assembly 695 approaches loin pulling table 704, cam follower 702, positioned on the underside of cross support 701, enters the area between guide plates 705 and 706 of cam 703. Since arm assembly 695 is slideably mounted in brackets 698, the entire arm assembly moves into appropriate alignment with respect to loin pulling table 704.

After arm assembly 695 is properly aligned with table 704, the Selsyn unit (not shown) stops the forward movement of frame 661 by stopping motor 669. Then motor 683 reverses and lowers frame 662, thereby lowering hog carcasses 50 to their respective stations. Arms 699 and 700 of arm assembly 695 are aligned with and drop through slots 738 and 739 in table 704, thereby setting down carcass 50 in shoulder straps 758 and 759 and in ham straps 746 and 747. As carcass 50 is set down on table 704, switch arm 782 is contacted, forcing it downward causing cam 781 to actuate limit switch 778. This starts motor 165 and lowers frame 162. Also, as carcass 50 is set down on straps 746 and 747, 758 and 759, carcass 50 communicates with vacuum cups 750 and 760 and 761, which, being connected to a vacuum source, hold carcass 50 firmly against straps 746, 747, 758 and 759. Arms 699 and 700 continue downward until they reach the full down position and motor 683 is stopped. Then the cycle of transfer mechanism 508 continues.

Hog carcass 50 is now in proper position on loin pulling table 704 for the scribe cut, and also cam plates 263 and 295 are set up for the particular length of hog carcass 50. Now it is necessary to describe the movement for vertical alignment of the loin cutting elements with the hog carcass.

With motor 165 started, shaft 172 of reducer 169 is rotated, causing pinion 174 and pinion 175 at opposite ends of shaft 172 to be turned. Pinion 174 meshes with gear 182 of Selsyn receiving unit 180. Pinion 175 meshes with gear 183 on shaft 184, which is rotatably mounted in pillow blocks 185, 186 and 187. The opposite ends of shaft 184 are secured to crank arms 206 and 207 which are rotatably secured to tie rods 163. Tie rods 163 are in turn rotatably secured to frame 162. As shaft 184 turns, frame 162 is lowered. Cross bars 164 provide vertical support for moving frame assembly 162. As frame 162 approaches its lowered position, periphery 209 of limit switch actuator 208 contacts roller 214 and actuates limit switch 215, which sets up the Selsyn system including Selsyn receiver unit 180 and Selsyn transmitter unit 805. Selsyn unit 805 is in the rotated position corresponding to the position of the fat/lean line of the loin. Selsyn unit 180 mechanically communicates with shaft 172 through pinion 174 and gear 182. When Selsyn unit 180 has been rotated to a position corresponding to the rotated position of Selsyn unit 805, motor 162 stops and magnetic brake 191 is energized thus locking 184 in a fixed position. All three movements required to bring carcass 50 and cutting elements 363 and 385 of the loin pulling mechanism into proper alignment have now been made.

The Selsyn system also starts motor 336 which turns sprocket 338. Since sprocket 338 meshes with chain 339, ball screw 329 is rotated because sprocket 334 also meshes with chain 339. Ball screw 329 threadably engages loin pulling carriage assembly 340 and pulls both knife 385 and saw 363 forward on the cutting stroke. Saw 363 leads knife 385 and cuts through the rib portions of the animal and knife 385 follows and removes the loin from the carcass. Though both loin knife 385 and saw 363 are carried forward by loin pulling carriage assembly 340, each rides on different cams and is guided by different rollers.

After the ribs have been cut, cam roller 311 on saw carriage 359 contacts cam 310, at which time carriage 359 moves upward, is carried into track 312, and is carried forward until stopped. Rollers 383 and 384 guide loin knife 385 in cam track 277, movement being from cam plate 260 to cam plate 263. The high point 281 of cam track 277 corresponds to the saddle position on a hog carcass. At this position, rollers 283 and 284 rise, following the contour of the animal. At the end of the forward stroke, rollers 283 and 284 rise on tracks 280 and are carried into track 278 until motor 336 is stopped. When limit switch 393 is actuated by actuator 391 contacting roller 392, motor 336 is stopped and is reversed, reversing carriage assembly 340. Rollers 283 and 284 ride on track 278 and drop down to track 277 on tracks 279. At the end of the reverse stroke, motor 336 is stopped by a limit switch (not shown). On the return stroke of loin pulling carriage 340, loin knife 385 returns a short distance above the cut line and pushes the cut loin from the carcass. When carriage 340 has returned to the starting position, the limit switch (not shown), which stops motor 336, also starts the reverse circuit of motor 165 in order to return carriage 162 to the up position. Also, magnetic brake 191 is released, allowing shaft 184 to rotate. The same limit switch releases brake 817, allowing Selsyn unit 805 to return to the zero position by spring 836. Selsyn unit 805 is stopped at the zero position since recess 821 of plate 819 contacts stop pin 822, which is secured to mounting table 809.

Now that the loin has been removed, it is necessary to pick it up from the loin pulling table 704 and transfer it to the subsequent station, the belly and back roll 510. It is necessary that the carcass be picked up so that the scribe cut remains in proper alignment. On the reverse horizontal stroke of transfer mechanism 508, arm assembly 696 is moved into proper relative alignment with table 704. This is accomplished by cam follower 707 being guided between guides 710 and 711 of cam 712 which is secured to the table 704. Cam follower 707 is attached to the upperside of cross support 701 of arm assembly 696. Arm assembly 696 is slideably positioned in supports 698 so that the assembly will move transverse in proper alignment with table 704. When assembly 508 is lifted, the carcass which has had its loin removed, is lifted out of the loin pulling station 509. Electromagnet **731*a* is de-energized when the mechanism 508 reaches its full up position, so that table 704 may be positioned by cable 726**.

The carcass is then carried to the belly and back roll station 510 which will be described in our co-pending application Serial No. 181,939. Following this operation, carcass 50 is picked up by arm assembly 697 from belly and back roll station 510 and is carried to the rib pulling station 511. The rib pulling operation will be more fully explained in our copending application Serial No. 181,939. After the ribs have been pulled, the belly and back will be split, which will be described in our copending application Serial No. 203,931.

While in the foregoing specification we have described the apparatus and method of procedure in considerable detail for the purpose of illustrating a specific embodiment of the invention, it will be understood that such details of structure and procedures may be varied widely by those skilled in the art without departing from the spirit of our invention.

We claim:

1. In loin pulling apparatus, a movably mounted table for supporting a portion of an animal carcass containing a loin, means for anchoring said animal carcass portion upon said table, a carriage movably mounted over said table, a scribe saw mounted on said carriage and over said table for severing the loin ribs from the spare ribs, U-shaped knife mounted on said carriage for removing said loin from said carcass, means for moving said carriage and thereby said scribe saw and said U-shaped knife in a vertical plane, means for positioning said table in order to bring said carcass into a predetermined position relative to said scribe saw and said U-shaped knife, a conveyor for moving said carcass to and from said table, said conveyor being equipped with laterally extending arms, said table being equipped with slots adapted to receive said arms, means for aligning the arms of said conveyor with the slots of said table so that said arms pass through said table, means for moving said carriage to cause said saw and said knife to sever the loin from said carcass, color-responsive means exposed to the forward face of the loin for controlling the vertical position of said scribe saw and said U-shaped knife, and cam means for guiding said scribe saw and said U-shaped knife during the severing movement.

2. In apparatus for severing a loin portion from an animal carcass half, a frame, an overhead carriage mounted on said frame, a scribe saw mounted on said carriage, a U-shaped loin-pulling knife also mounted on said carriage, means for raising and lowering said carriage and thereby said saw and said knife, control means for adjusting the vertical position of said raising and lowering means so as to adjust for the depth of cut of said saw and knife, and means for moving said carriage forwardly for severing said loin from said animal carcass half.

3. In loin-pulling apparatus, a movably-mounted table for supporting a portion of an animal carcass containing a loin, means for anchoring said animal carcass portion upon said table, a carriage movably mounted over said table, a scribe saw mounted on said carriage and over said table for severing the loin ribs from the spare ribs, a U-shaped knife mounted on said carriage for removing said loin from said carcass, means for moving said carriage and thereby said scribe saw and said U-shaped knife in a vertical plane, means for positioning said table in order to bring said carcass into a predetermined position relatively to said scribe saw and said U-shaped knife, a conveyor for moving said carcass to and from said table, said conveyor being equipped with laterally-extending arms, and said table being equipped with slots adapted to receive arms, means for aligning the arms of said conveyor with the slots of said table so that said arms pass through said table, and means for moving said carriage to cause said saw and said knife to sever the loin from said carcass.

4. In loin-pulling apparatus, a movably-mounted table for supporting a portion of an animal carcass containing a loin, means for anchoring said animal carcass portion upon said table, a carriage movably mounted over said table, a scribe saw mounted on said carriage and over said table for severing the loin ribs from the spare ribs, a U-shaped knife mounted on said carriage for removing said loin from said carcass, means for moving said carriage and thereby said scribe saw and said U-shaped knife in a vertical plane, means for positioning said table in order to bring said carcass into a predetermined position relative to said scribe saw and said U-shaped knife, a conveyor for moving said carcass to and from said table, said conveyor being equipped with laterally-extending arms, said table being equipped with slots adapted to receive said arms, means for aligning the arms of said conveyor with the slots of said table so that said arms pass through said table, means for moving said carriage to cause said saw and said knife to sever the loin from said carcass, and cam means for reversing the movement of said carriage and said knife to transfer the severed loin portion to a point of discharge.

5. In apparatus for severing a loin portion from an animal carcass half, means for moving said carcass half in sidewise position in a path of travel, means in said path of travel for removing an end portion of the carcass to expose one end of the animal loin, a support, means for moving said remaining carcass portion containing the loin into endwise position upon said support, a frame, an overhead carriage mounted on said frame, a scribe saw mounted on said carriage, a U-shaped loin-pulling knife also mounted on said carriage, means for raising and lowering said carriage and thereby said saw and said knife, control means for adjusting the vertical position of said raising and lowering means so as to adjust for the depth of cut of said saw and knife, and means for moving said carriage forwardly for severing said exposed loin portion from said animal carcass portion.

References Cited in the file of this patent

UNITED STATES PATENTS

| | | |
|---|---|---|
| 1,083,219 | Sawyer | Dec. 30, 1913 |
| 2,156,771 | Sadoff | May 2, 1939 |
| 2,510,173 | Harter | June 6, 1950 |
| 2,521,241 | Minaker | Sept. 5, 1950 |
| 2,565,727 | Henderson | Aug. 28, 1951 |
| 2,962,752 | Massengill | Dec. 6, 1960 |